United States Patent [19]

Moller

[11] Patent Number: 5,115,996
[45] Date of Patent: May 26, 1992

[54] VTOL AIRCRAFT

[75] Inventor: Paul S. Moller, Dixon, Calif.

[73] Assignee: Moller International, Inc., Davis, Calif.

[21] Appl. No.: 472,696

[22] Filed: Jan. 31, 1990

[51] Int. Cl.$^5$ ............................................. B64C 29/00
[52] U.S. Cl. ................................. 244/12.5; 244/23 D; 244/52; 239/265.19; 239/265.27; 239/265.25
[58] Field of Search ............ 244/12.5, 23 D, 2, 23 R, 244/23 A, 52, 219; 415/148, 150, 167; 239/265.13, 265.19, 265.25, 265.27, 265.29, 265.31

[56] References Cited

U.S. PATENT DOCUMENTS

| | | | |
|---|---|---|---|
| 2,923,494 | 2/1960 | Strong | 244/2 |
| 3,061,242 | 10/1962 | Zurawinski et al. | 244/52 |
| 3,081,597 | 3/1963 | Kosin et al. | 244/52 |
| 3,087,303 | 4/1963 | Heinze et al. | 244/52 |
| 3,206,929 | 9/1965 | Marchant et al. | 244/52 |
| 3,259,338 | 7/1966 | Schmidt | 244/52 |
| 3,262,511 | 7/1966 | Carr | 244/52 |
| 3,265,142 | 8/1966 | Winter | 244/52 |
| 3,291,242 | 12/1966 | Tinajero | 244/2 |
| 3,292,864 | 12/1966 | Edkins | 244/52 |
| 3,486,577 | 12/1969 | Jackes | 244/23 R |
| 4,071,207 | 1/1978 | Piasecki et al. | 244/12.5 |
| 4,804,155 | 2/1989 | Strumbos | 244/52 |

FOREIGN PATENT DOCUMENTS

| | | | |
|---|---|---|---|
| 1223854 | 7/1987 | Canada | 244/23 R |
| 457705 | 12/1924 | Fed. Rep. of Germany | 244/23 R |
| 2054536 | 5/1972 | Fed. Rep. of Germany | 244/23 D |
| 1281653 | 12/1961 | France | 244/23 R |
| 1136331 | 12/1968 | United Kingdom | 244/12.5 |

Primary Examiner—Joseph F. Peters, Jr.
Assistant Examiner—Anne E. Bidwell
Attorney, Agent, or Firm—Rosenblum, Parish & Bacigalupi

[57] ABSTRACT

A VTOL aircraft including a fuselage with four nacelles, three vertical stabilizers and a horizontal stabilizer attached to the fuselage. The fuselage and the nacelles are lifting bodies that are configured to jointly form an aerodynamic lifting body which cooperates with the horizontal stabilizer to provide aerodynamic lift to the aircraft in forward flight. Each nacelle contains two rotary engines directly driving corresponding fans which face each other and operate in counter-rotating directions. Each nacelle also contains a system of vanes located at the rear opening thereof, and actuators for extending and retracting the vanes to deflect the airflow over a predetermined range of angles from the horizontal. Each engine utilizes the dynamic pressure of the air behind the fans to provide a source of air for cooling the rotors and exhaust system. A triple redundant computerized flight control system maintains the stability of the aircraft as it transitions from one flight regime to another as well as in flight. The system of vanes alone can also be used as an apparatus for gas or fluid stream directional control.

38 Claims, 15 Drawing Sheets

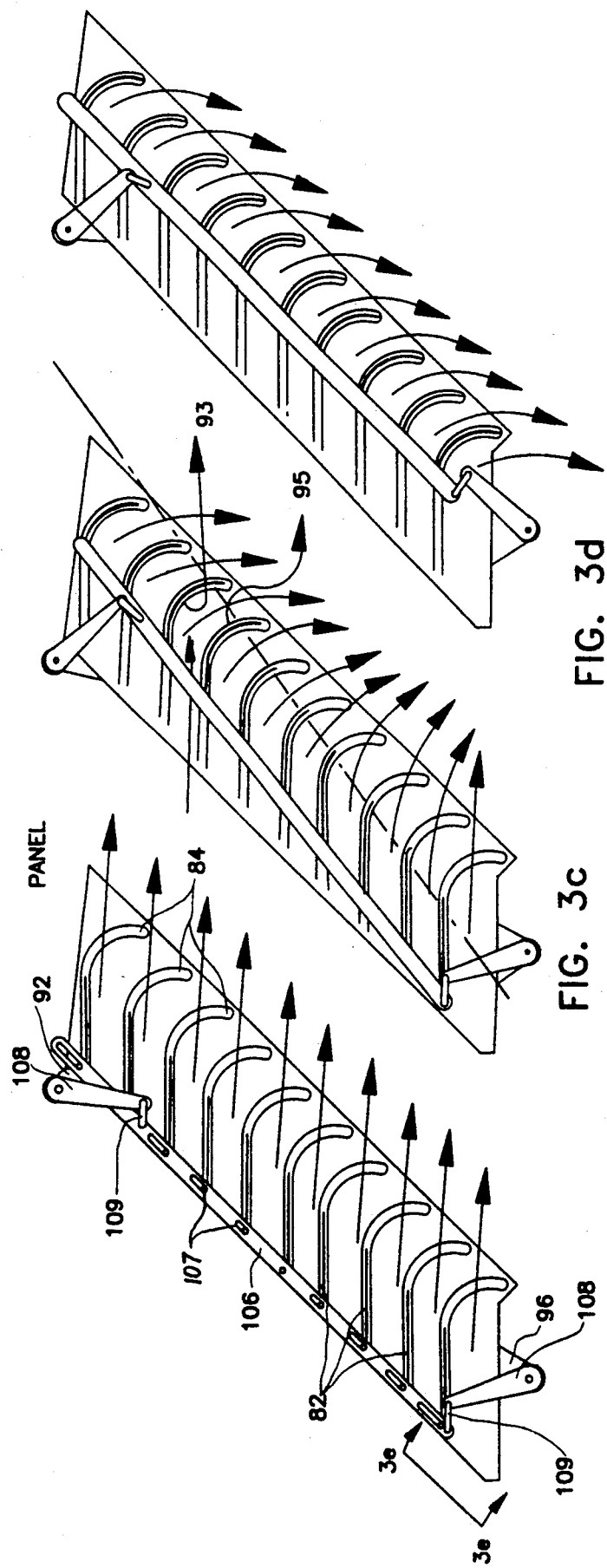

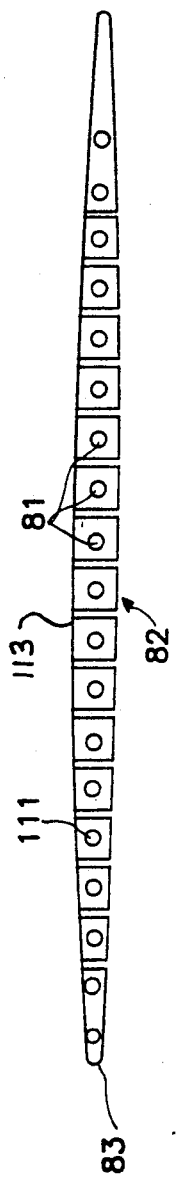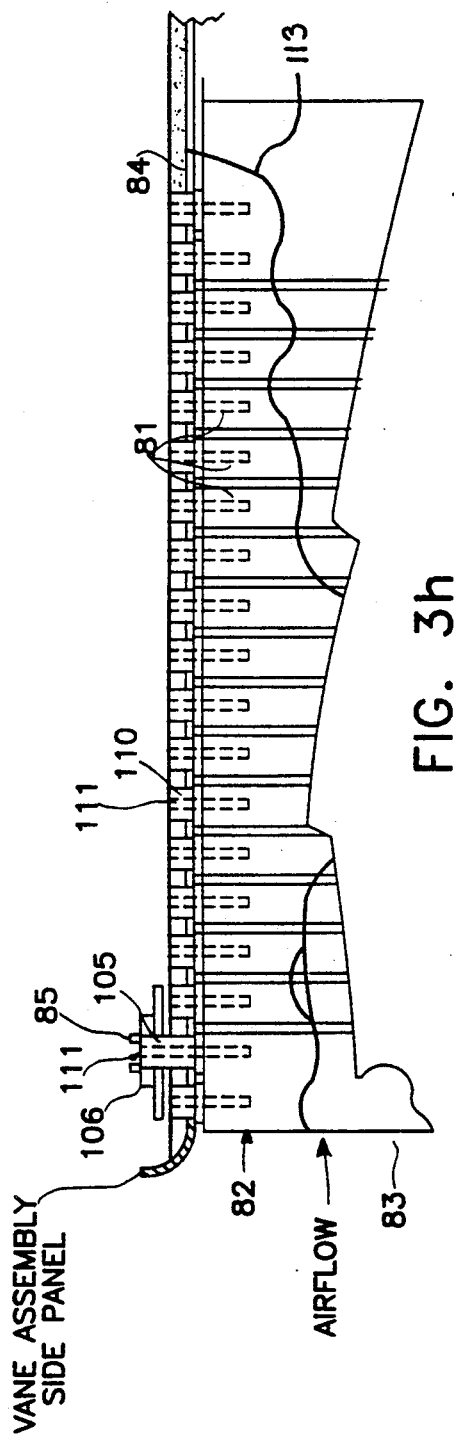
FIG. 3g
FIG. 3h

VTOL AIRCRAFT

BACKGROUND OF THE INVENTION

1. Field of the Invention

The present invention relates generally to VTOL aircraft, and more particularly to an improved VTOL aircraft and ducted fan propulsion system wherein the ducts housing the engines remain stationary with their axial center lines approximately parallel with the center line of the fuselage, and the thrust is selectively vectored by adjustable vanes mounted in the aft portion of each duct.

2. Brief Description of the Prior Art

Over the past 53 years, inventors have attempted to create a vehicle that could be flown in the air as well as driven on land. According to an article in the February 1989 issue of Smithsonian Magazine, more than 30 designs for flying cars have been submitted to the U.S. Patent Office since 1936. These early designs combined elements of the automobile with those of the airplane. Since the fuselage of the craft was large, usually the size of a passenger compartment of a car, a huge, powerful engine and large wings were needed to generate enough thrust and lift to make the craft airborne. On the ground, the huge engine was unnecessary and thus inefficient, the exposed propeller (if one was used) was a safety hazard, and the large wings had to be removed and stored prior to driving the craft on the road.

The present invention is an aircraft that can be used as a land vehicle efficiently and without modification. A major difference between the present invention and the prior car/plane inventions is that the present invention is all one structure so it provides efficiency in the air as well as on the ground. Ducted fans are used instead of exposed propellers so safety is not compromised. Half of the engines can be shut down for fuel conservation and efficient operation of the aircraft while being driven on land. Additionally, the outboard segments of the short wings are hinged to be folded easily, and thus do not have to be removed from the craft prior to driving.

Another feature of the present invention is that it is capable of vertical takeoff and landing (VTOL) by vectoring the fan thrust from the ducted fan engines. Previous VTOL efforts have relied on fixed orientation of the duct centerlines vertically for hover and then re-directing their thrust with vanes for transition into forward flight. This method was used with rigid re-directing vanes that would stall the airflow at angles above 15 degrees. This rigid vane approach resulted in a limited ability to generate a significant transverse force for acceleration. The alternative has been VTOL aircraft that have tilted the entire duct or the exposed propeller, whichever was used, in order to vector the thrust. A tiltable duct or propeller requires complex structural, electrical and mechanical connections. Furthermore, the tilting duct or propeller experiences off-axis flow into the inlet during transition into forward flight, resulting in flow separation at the upstream inlet lip. The rotation of the duct or propeller is inherently slow to react and cannot be modulated to provide the fast response time that is required for longitudinal control. Additionally, the tilting duct is not an efficient annular airfoil, and therefore additional wing area must be provided for aerodynamic lift. This greater wing area results in additional drag.

U.S. Pat. No. 4,358,074 shows a propulsion system for VTOL aircraft having stationary ducts which vector the airflow by utilizing a movable, fixed camber, cascading vane system in addition to a slotted flap system. The airflow within the nacelle is divided into twin airstreams. One of the airstreams is directed downwardly through the fixed camber vane system. The other airstream is exhausted through an aft nozzle at the outlet, against a slotted flap system mounted on a wing located immediately behind the duct. The fixed camber vane system can only direct a limited amount of airflow through very modest angles before the flow separates creating large pressure and thrust losses. The divided airstream system is required because it would be difficult to deflect the full airstream through large angles by utilizing the wing flap system alone.

Variable camber flow deflector blades, in which each blade (similar to a vane) is capable of resiliently deforming to affect airflow direction, are the subject of U.S. Pat. No. 4,235,397. In this patented invention, the leading edge of the blade is anchored and the trailing edge of the blade is affixed to a mechanism which pulls the trailing edge downward in an arc, so that the blade is effectively bent, thereby re-directing the airflow. This configuration requires that the blade be great enough in width to house an effective leaf spring member and it also limits the materials that the blade skin and filler can be made of. Another type of airfoil variable cambering device is the subject of U.S. Pat. No. 4,247,066. Both of these patented inventions utilize mechanical parts that are subject to high stress loads. These complex mechanical devices are slow to react due to the particular interaction of the mechanical parts and cannot provide the fast response times desirable for attitude and altitude control.

OBJECTIVES OF THE PRESENT INVENTION

It is therefore a primary objective of the present invention to provide an improved ducted fan VTOL aircraft capable of vertical takeoff and hover, forward flight and all regimes of transition between hover and forward flight.

Another objective of the present invention is to provide a VTOL aircraft having multiple nacelles, with a powerplant configuration within each horizontal nacelle combining two rotary engines, each driving a fan, with the fans facing each other and counter-rotating.

A further objective of the present invention is to provide a VTOL aircraft having multiple nacelles, each of which includes a system of extendable, retractable and flexible vanes capable of selectively deflecting the airflow out of the nacelles downwardly to an angle substantially perpendicular to the lateral axis of the nacelle.

An additional objective of the present invention is to provide a general purpose apparatus having a system of vanes capable of redirecting and controlling a large velocity stream of gas or liquid with little actuation power and little thrust or pressure losses.

Yet another objective of the present invention is to provide a ducted fan driven VTOL aircraft having an exhaust system that utilizes the dynamic pressure of the air behind the fans to cool the rotors, the exhaust pipes and the baffle structure.

A still further objective of the present invention is to provide a multi-engine, ducted fan VTOL aircraft of the type described above, having a triple redundancy flight control system which regulates the thrust of each engine and the amount of deflection of each set of vanes in order to provide a stable platform in all flight regimes.

SUMMARY OF THE PREFERRED EMBODIMENT

Briefly, a preferred embodiment of the present invention includes a fuselage with four nacelles, three vertical stabilizers, and a horizontal stabilizer attached to the fuselage. The fuselage and the nacelles are configured to jointly form an aerodynamic lifting body which co-operates with the horizontal stabilizer to provide aerodynamic lift to the aircraft. Each nacelle contains two rotary engines, each of which directly drives a fan. The fans face each other and operate in counter-rotating directions. Each nacelle also contains a system of vanes located at the rear opening thereof, and means are provided for extending and retracting the vanes to deflect the airflow over a predetermined range of angles from the horizontal. Each engine utilizes the dynamic pressure of the air behind the fans to cool the engine's rotors and exhaust system. A triple redundant computerized flight control system maintains stability of the aircraft as it transitions from one flight regime to another, as well as in flight.

ADVANTAGES OF THE INVENTION

An important advantage of the present invention is that it provides an aircraft which smoothly and easily transitions between takeoff or hover modes and forward flight, without any transient decrease in stability.

Another advantage of the present invention is that it includes ducted nacelles which are stationary and thus need no complex structural, mechanical and electrical connections.

An additional advantage of the present invention is that each nacelle includes a system of vanes which are adjustable to deflect airflow out of the nacelle over a range of more than 90 degrees with only a slight decrease in the airflow cross section, therefore minimizing the loss of thrust in transition from one extreme to another.

The use of two engines and fans in each nacelle provides the benefit that failure of one engine will result in only a partial reduction of thrust from that nacelle if the remaining engine is operated near its maximum output.

Yet another advantage of the present invention is that the fans face each other and counter-rotate, thereby cancelling the gyroscopic moments which might otherwise interfere with pitch, yaw, and roll control. Also, the swirl in the flow induced by the first fan is cancelled by the second counter-rotating fan so that swirl energy, normally lost, is recovered.

It is another advantage of the present invention that one engine in each nacelle can be shut down when maximum speed or power is not required, thereby increasing the range and operating efficiency.

Another advantage of the present invention is that the shrouded fans are buried deep in their ducts and counter-rotate, thereby keeping fan noise to a minimum.

An advantage gained by the present invention is that it provides a powerplant design having improved rotor and exhaust cooling features needing no auxiliary pump to accomplish the necessary cooling.

Another advantage of the present invention is that it includes a computer operated flight control system which, through feedback from inertial sensors and actuator response sensors in the nacelles, keeps the vehicle balanced during flight and implements the pilot's commands for desired pitch, yaw and roll motion.

Yet another advantage of the present invention is that two engines are used in each nacelle thereby providing that adequate pitch and roll control can be maintained through power modulation should one engine in a nacelle fail.

An advantage of the present invention is that a heavy firewall between the engines and cockpit is not necessary, due to the utilization of engines with a small frontal profile which can be mounted in a nacelle that is attached to the fuselage, rather than having the engines within the fuselage near the cockpit.

These and other objects and advantages of the present invention will no doubt become apparent to those skilled in the art after having read the following detailed description of the preferred embodiment which are contained in and illustrated by the various drawing figures

IN THE DRAWING

FIGS. 3b through 3d are partial cross-sectional views through the nacelle taken along the line 3—3 of FIG. 3a, showing the interior wall of a vane guide containing panel of the nacelle together with the vane control mechanisms and vanes in various control positions.

FIG. 3g is a side view of a vane showing the vane segments and connecting membrane.

FIG. 3h is a partial bottom view of a vane with the membrane broken away illustrating details of vane construction.

FIG. 6b is a block diagram representing the various actuators and sensors contained within each nacelle block shown in FIG. 6a.

DETAILED DESCRIPTION OF THE PREFERRED EMBODIMENT

Figure 1:
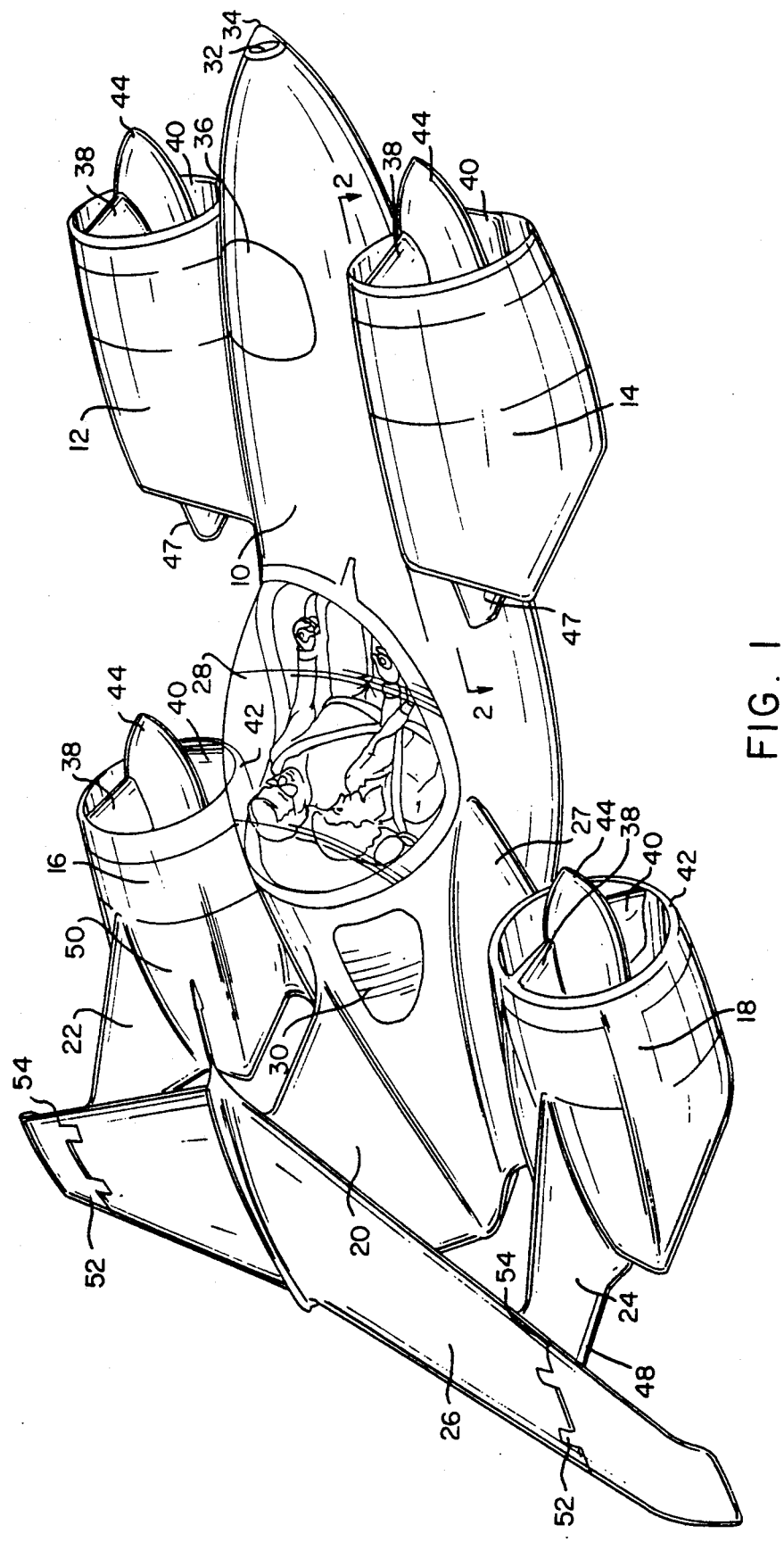
FIG. 1 is a perspective view of a presently preferred embodiment of a VTOL aircraft according to the present invention.

FIG. 1 shows a perspective view of a preferred embodiment of a VTOL aircraft in accordance with the present invention. As depicted, the preferred embodiment includes an elongated fuselage 10 with four nacelles 12, 14, 16, and 18 attached to the fuselage. Two of the nacelles 12 and 14 are located on each side of the fuselage 10 forward of the center of gravity of the fuselage, and the other two nacelles 16 and 18 are located on each side of the fuselage 10 rearward of the center of gravity of the fuselage. The two front nacelles 12 and 14 are attached directly to the fuselage, while the rear nacelles 16 and 18 are each appended to the fuselage by a bridge 27. The preferred embodiment also includes three vertical stabilizers 20, 22 and 24. The center vertical stabilizer 20 is attached to and rises from the rear of the fuselage 10, while each of the two outward vertical stabilizers 22 and 24 is attached to and rises from a rear nacelle 16 and 18. A horizontal stabilizer 26 is displaced atop the three vertical stabilizers 20, 22 and 24 and attached thereto.

The fuselage 10 is aerodynamically shaped for maximum lift. A sturdy transparent canopy 28, displaced approximately centrally along the fuselage, covers the cockpit and is pivotable into an open position for pilot and passenger boarding. Just behind the canopy 28 are two passenger windows 30, one on each side of the fuselage 10. Only one passenger window 30 is shown in FIG. 1. At the very tip of the fuselage 10 is a headlight 32 surrounded by a transparent plastic headlight cover 34 for protection. The hatch 36 opens to reveal the storage and cargo area in the fore section of the fuselage 10. The aft section of the fuselage houses an emergency parachute, deployable by rocket power, for the unlikely event of a catastrophic engine failure.

The parts of the nacelles 12, 14, 16 and 18 that are illustrated in FIG. 1 are the engine mounting struts 38 and 40, the exhaust shrouds 42, the engine accessory nose cones 44, and the dividing struts 47. These parts will be explained in further detail to follow.

Attached to the midpoint of the leading edge of the horizontal stabilizer 26 is a Pitot-static tube 50 for measuring the air speed of the aircraft. Also shown in this preferred embodiment are the hinges 52 at the folding joint 54 of the horizontal stabilizer 26 which allow the outboard segments to be folded.

Figure 2A:
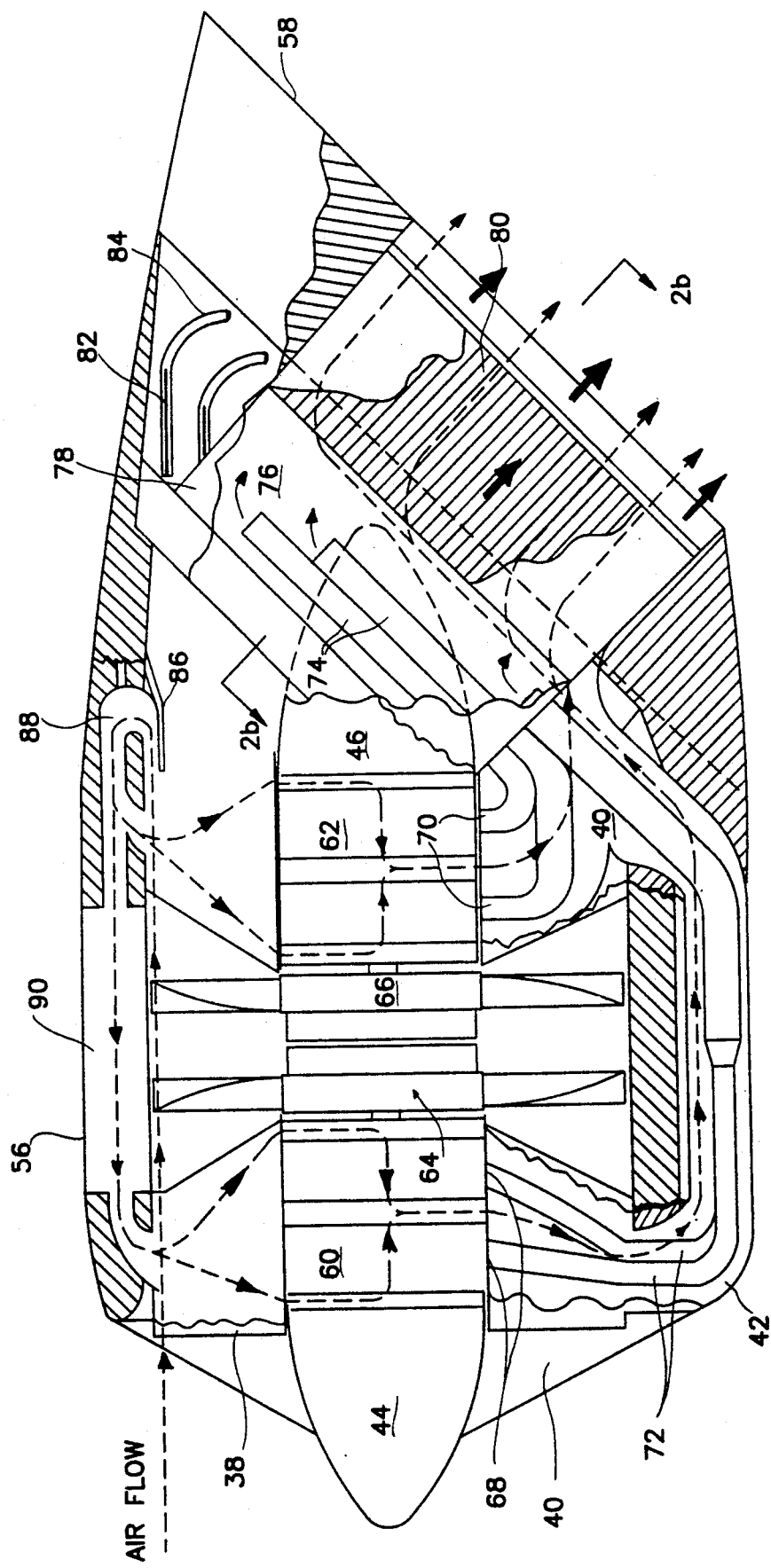
FIG. 2a is a longitudinal cross sectional view through the nacelle taken along the line 2—2 of FIG. 1.

FIG. 2a is a longitudinal cross sectional view of a nacelle. This view is typical of all four nacelles, but for the purpose of this description, a cross section of nacelle 14 taken along the lines 2—2 of FIG. 1 is shown.

Generally, the nacelle housing 56 has an annular airfoil shape transitioning at the rear opening 58 to a more rectangular configuration. The rear opening of the nacelle is angled along a plane whose top is rotated rearwardly relative to normal to the longitudinal axis of the nacelle. The nacelle contains two rotary engines 60 and 62, each capable of producing approximately two horsepower per pound of engine weight, while each nacelle is capable of producing three to four pounds of thrust per horsepower. Each engine directly drives a fan 64 and 66. The fans 64 and 66 face each other and counter-rotate. Each front engine 60 has an engine accessory nose cone 44 and each rear engine 62 has an engine accessory tail cone 46. The nose and tail cones are generally conically shaped with a rounded tip to effectuate a streamlined flow of air through the nacelle. Within these nose and tail cones 44 and 46 is a convenient place to position the engine accessories out of the airflow. The engine accessories include the carburetor, starter and air filter. To hold the engine in place, each engine 60 and 62 is bolted to the engine mounting struts 38 and 40 which span the distance between the inside wall of the nacelle housing 56 and the engine.

Each of the dual exhaust ports 68 of the first engine 60 is connected to one end of an exhaust pipe 72. The exhaust pipes 72 extend radially outwardly through the lower engine mounting struts 40 and then along the base of the nacelle, within the exhaust shroud 42 where they both connect into a single, larger exhaust pipe. The outlet end of the exhaust pipe extends into an exhaust chamber 76 contained within the dividing strut 78. Each of the dual exhaust ports 70 of the second engine 62 is likewise connected by an exhaust pipe 74 to the exhaust chamber 76 which contains the exhaust gases and directs the gases into the baffle structure 80. The exhaust gases are vented through the baffle structure 80 and exit out the rear opening 58 of the nacelle.

The vanes 82 are located in the rear of the nacelle just before the opening. The vanes 82 are placed in a cascading fashion inside the rear opening 58 of the nacelle. FIG. 2 shows the vanes in their fully retracted position. The guide slots 84, formed in the wall of the nacelle housing 56, define the path that the vanes will travel when they are extended for airstream deflection. Vane actuation will be described in more detail to follow.

The unique motor cooling/exhaust system of the present invention uses the dynamic pressure of the air behind the second fan 66 as a source of pressurized air for cooling the engines rotors, exhaust pipes and baffle structure. Although not specifically shown in the drawing, a portion of this air is also directed to the naturally aspirated carburetor. Pressurized air enters the diffuser 88 through an air intake scoop 86 that extends into the airstream behind the second fan 66. The velocity of the air is then slowed in the diffuser 88 before entering a plenum chamber 90. The air moves from this plenum chamber 90 through the hollow engine mounting struts 38, into each engine to cool the rotors, and then exits through the lower engine mounting struts 40.

The cooling air from the first engine 60 flows through the exhaust shroud 42 and around the exhaust pipes 72, on its way to surround the exhaust chamber 76 and baffle structure 80 prior to exiting from the dividing strut 78. The cooling air from the second engine 62 similarly flows around exhaust pipes 74, the exhaust chamber 76 and the baffle structure 80 prior to exiting.

Figure 2B:
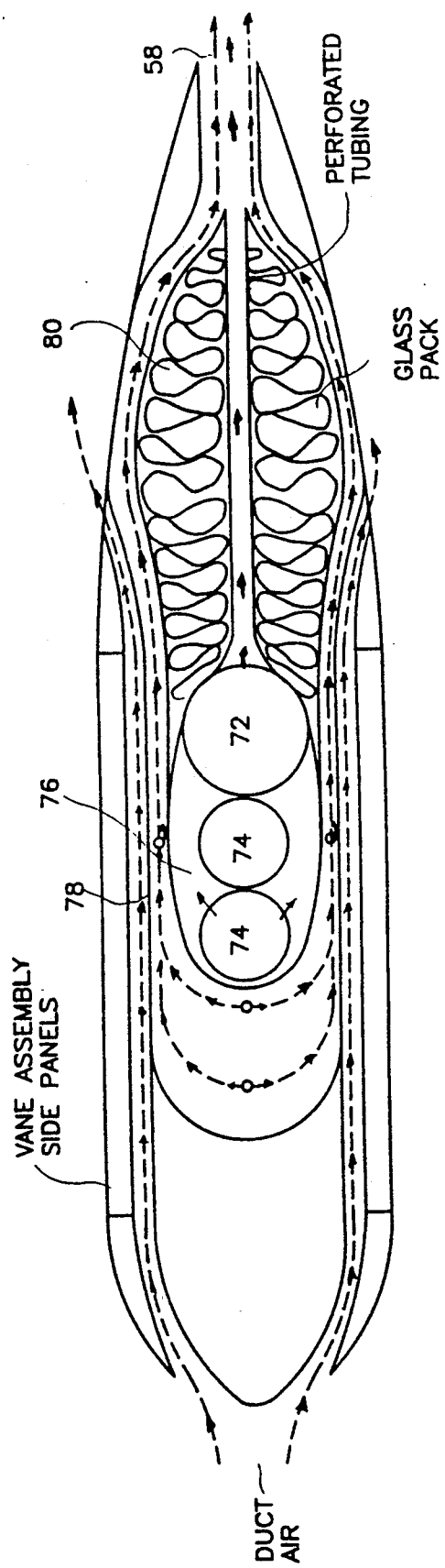
FIG. 2b is a partial top view of a nacelle showing a cooling system for the exhaust chamber and baffle structure, which is contained within the dividing strut.

FIG. 2b is a top view of a dividing strut further illustrating the flow of the cooling air around the exhaust chamber 76 and the baffle structure 80. After flowing around the length of both sets of exhaust pipes 72 and 74, the cooling air enters the dividing strut 78 and flows into the space between the inside wall of the dividing strut 78 and the exhaust chamber 76. The disposition of the exhaust chamber 76 and baffle structure 80 within the dividing strut 78 forces the cooling air to flow around both of these parts, thereby cooling them, prior to exiting out of the dividing strut 78 at the rear opening of the nacelle 58.

The exhaust muffler exit is designed as an air ejector. This means that as the exhaust gases leave the muffler, but while still contained by the side-walls, they entrain (pick-up and accelerate) the cooling gases that have come from the rotor. This generates a suction on the outlet for the cooling air and augments the positive pressure at the inlet, behind the second fan. This entrainment effect contributes to the pumping of the cooling air.

The unique vane assembly is capable of re-directing large volumes of air and vectoring large thrust forces with very little actuating power or force required. The vanes and their integration with power level or thrust level allows for replacement of all of the traditional controls of the airplane: i.e. ailerons for roll, elevators for pitch and rudders for yaw. These vanes also allow for replacement of all of the traditional controls of the helicopter: i.e. cyclic rotor pitch control for pitch and roll, collective rotor pitch control for climb and tail rotor pitch for yaw control.

Figure 3A:
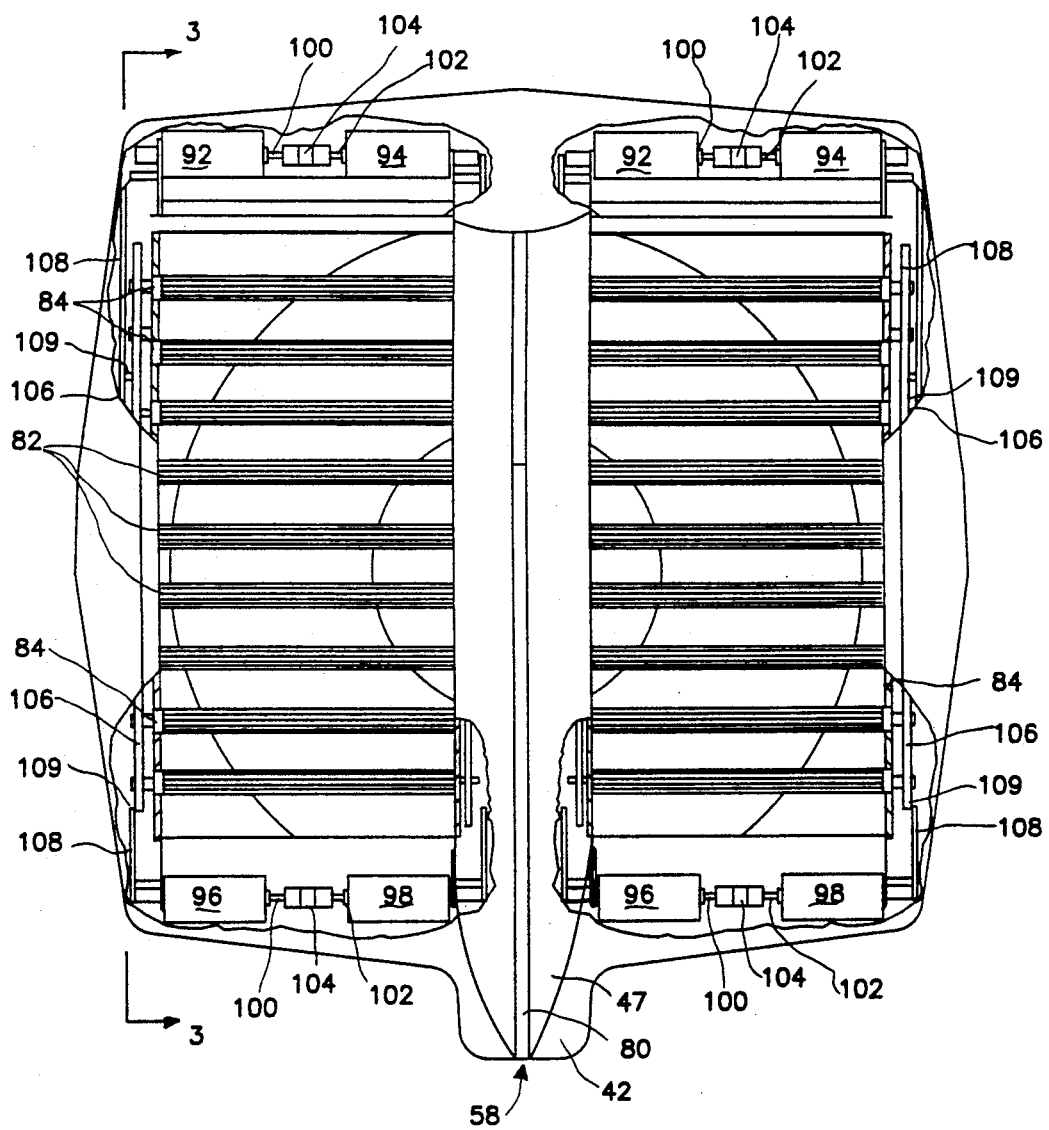
FIG. 3a is a diagram showing a rear view of the nacelle shown in FIG. 2.

Considering the vane assembly in greater detail, FIG. 3a is a rear view of a typical nacelle. This view shows that there are two independent sets of vanes, one set disposed within the left half of the nacelle exit opening and the other set covering the right half of the nacelle exit opening. Together, the vanes 82 span the width of the rear opening 58 of the nacelle and are mounted within guide slots 84 formed in facing wall surfaces and arranged in a cascading fashion inside the rear opening 58 of the nacelle. The vanes are constructed so as to be rigid along their span yet flexible in the airflow direction so that camber may vary through a range of angles.

The cutaway portions of FIG. 3a expose the vane actuation assemblies for the vanes 82. One pair of drive motors 92 and 94 is located at the top of a set of vanes, and another pair 96 and 98 is located at the bottom of the set of vanes. The drive shaft 100 and 102 of each pair of motors is connected by a coupler 104 to maintain symmetry in the movement of the vanes. Each motor 92, 94, 96 and 98 is connected to an actuator bar 106 through an actuator arm 108 and linkage 109 assembly.

FIG. 3b is a partial side view through a nacelle taken along the lines 3—3 of FIG. 3a. This figure shows the interior wall of a vane guide containing panel of the nacelle with the vane actuation assembly attached. Guide slots 84 are formed within the panel, and provide direction for the flexible vanes 82 when they are extended or retracted. The outermost edges of each span of vanes is contained within a guide slot 84 and moves therewithin on rollers. The outermost point of the leading edge of a vane 82 is attached to an actuator bar 106 at an oval slot 107 which allows the actuator bar to be moved at an angle limited by the bounds of the slot, as shown in FIG. 3c and further discussed below. Deployment of the vanes is achieved by a drive motor 92, 94, 96, 98 and an actuator arm 108 and linkage 109 assembly which moves the actuator bar 106. The motor, arm and linkage drive the actuator bar which in turn moves the vanes. The vanes move on the rollers within the guide slots along the path defined by the configuration of the guide slots.

The actuator arms 108 are attached to the top and bottom of the actuator bar 106 by linkages 109, the linkage for the upper actuator arm being attached between the second and third vanes from the top of the bar, and the linkage for the lower actuator arm being attached at the bottom of the bar. This configuration allows the bar to be moved in parallel relationship to the rear opening of the nacelle so that all of the vanes extend and retract simultaneously between the extremes depicted in FIGS. 3b and 3d. Alternatively, by differentially controlling top pair of motors 92 and 94 and bottom pair of motors 96 and 98, the bar can be moved to an angled position relative to the rear opening so that the vanes at the top of the set are extended more than the lower vanes as depicted in FIG. 3c. The oval slots 107 of the actuator bar 106 define the maximum angle that this configuration can achieve.

The vanes can be extended to the same degree simultaneously, or can be differentially extended such that the top vane is moved rearwardly while the bottom vane is held in its fully retracted position, and the balance of the vanes are progressively extended from bottom to top as shown in FIG. 3c. The purpose of this differential vane extension is to avoid flow separation during transition from one vane setting to another. Similarly, retraction of the lower vanes prior to the upper vanes tends to reduce the occurrence of flow separation in the airstream being deflected by the vanes.

Additionally, the coupler 104 will freeze both motors in the pair, in the event that one motor fails. The redundancy of motors is a safety feature. If one motor should fail, it and its partner would freeze and the other pairs of motors could drive about 75% of all of the vanes in a nacelle for ample deflection of the airflow.

Figure 3E:
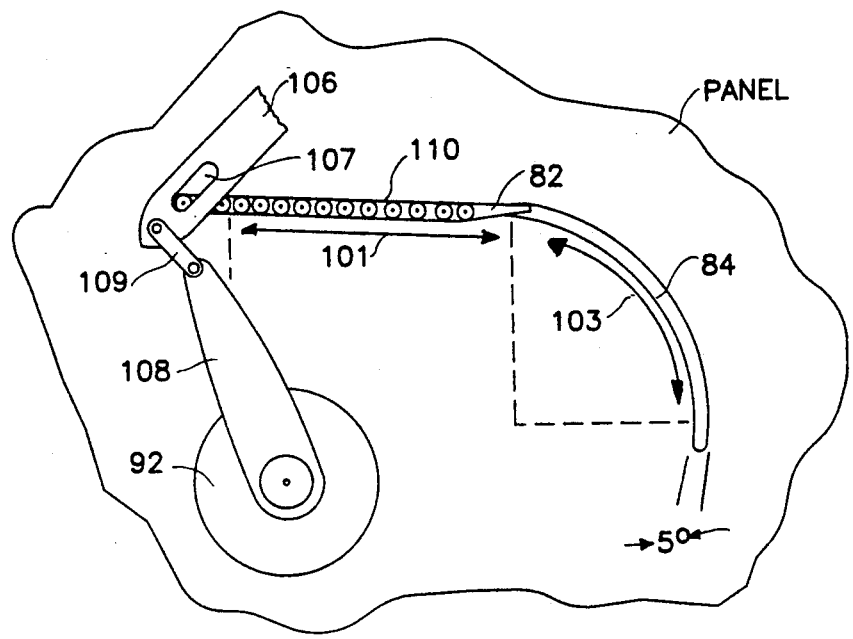
FIGS. 3e and 3f are side views of a vane guide containing panel taken along lines 3e—3e of FIG. 3b.
Figure 3F:
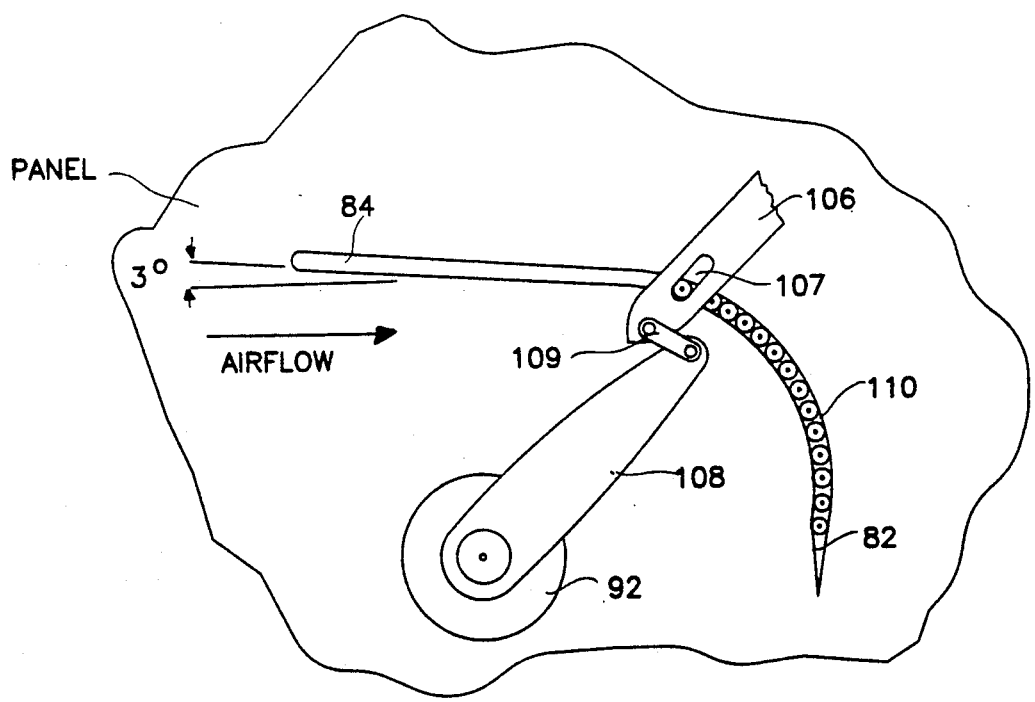

In forward flight, the vanes 82 will normally be fully retracted as shown in FIG. 3e. In this position, the vanes are essentially horizontal and no air is deflected. The normal position of the vanes 82 for takeoff or hover modes is fully extended as shown in FIG. 3f. Here, the vanes are fully extended by being moved rearwardly in the guide slots 84 and are thus configured to deflect the airflow perpendicular to the longitudinal axis of the aircraft.

The vanes may be extended to any point between these extreme modes as required during the transition between takeoff and forward flight, or just as needed for aircraft balance and stabilization.

FIG. 3g, a side view of a vane, and FIG. 3h, a bottom view with the outermost skin layer of flexible material shown broken away, illustrate the tambour-like construction of the flexible vanes. Each vane 82 is made of segments 81, journalled to rollers 110 which are displaced within the guide slots 84. The rollers move within the guide slots to allow the segments to be reoriented in relation to each other depending on their collective posture relative to the guide slots. The segments 81 are connected together by a flexible membrane 113 attached to the upper surfaces thereof. Each vane 82 is connected to the actuator bar 106 at its leading edge 83 by a vane pin 111 and grommet 105 assembly, and held in place by a snap ring 85.

The use of connected segments in the construction of the vanes allows each vane to be flexible in the airflow direction so that its camber may vary to conform to the curved path of the guide slot, yet maintain rigidity in the span direction in order to deflect the air flowing out of the nacelle.

Four common airflow deflection problems have been overcome by the vane design of the present invention: 1) redirecting the exiting flow efficiently over at least 90 degrees while not inducing significant pressure and thrust losses; 2) doing this without requiring the use of a large and complex actuation mechanism; 3) constraining the vane with sufficient support to ensure that its varying camber is accurately controlled and stiffened in order to prevent aerodynamic flutter; and 4) ensuring that the vanes do not generate a significant aerodynamic loss when they are in the retracted position for horizontal flight.

More specifically, the solution in the instant design includes the provision of one or more variable camber vanes, using graphite fiber-composites which have the strength of steel and the weight of magnesium. As indicated in FIG. 3e, the guide slot shape is determined by a circularly arcuate section 103 that follows a straight section 101. As depicted in FIG. 3f, the straight section is inclined to the upstream flow at approximately 3 degrees. As illustrated in FIG. 3g and 3h, the segments are connected together by a flexible membrane 113 attached to the upper surfaces thereof. This design was selected to ensure that disturbances to the surface will be confined as much as possible to the concave side (bottom side) of the vane where the pressure gradients on the surface are favorable, thereby tending to reduce airflow separation from the top surface. The top (non-grooved) side is kept smooth by the membrane. The vanes are as thin as possible while still retaining the necessary flutter resistance.

A further element of the design that reduces the effective duct blockage from the vanes is the staggered relationship of one vane to the other. This means that, as shown in FIG. 3c, the airflow is contracting due to one vane surface 93 while it is expanding because the facing adjacent surface 95 is set further ahead in the duct. In forward flight (FIG. 3e), the vanes are generally in a horizontal disposition (extended to a 5 to 7 degree deflection angle). On command from the on-board computer or pilot, these vanes can be either extended or retracted within the guide slots. This movement provides the equivalent of aileron or elevator control depending on their individual manipulation.

The only force required to actuate the vanes is that required to overcome friction. This is due to the fact that all forces on the vane segments are transmitted at right angles to the vane segment centerlines through the pins and rollers. This means that the large deflection forces are directed normal to and carried by the deflection vane slots and are not directed along the length of the vane slots, i.e. the direction of actuation. This allows a large thrust to be redirected over a wide range of angles without any substantial counteracting control force being required from the vane actuation system. The use of a large number of pins and rollers ensures that the vanes are accurately contoured and uniformly constrained at their ends during their movement, and thereby resist aerodynamic flutter under all conditions.

It has been noted that if the cross-section of the airstream between two adjacent vanes is examined, the area increases quite rapidly (approximately a 40% expansion) over a distance of about 1½ times the distance of the gap width between vanes. This translates into a very rapid expansion (slowing down) of the airflow that could not occur without separation unless the expansion is immediately followed by a contraction. When the vanes are deflecting the airstream through 90 degrees, the expansion is followed by a generally equal contraction, so the overall pressure loss is low. However, when the vanes are all retracted together to 45 degrees, the contraction after the expansion disappears and flow separation occurs resulting in a significant pressure loss.

In this design, such flow separation has been eliminated by use of an actuation mechanism that retracts the vanes from the bottom first. This ensures that the concave side of the vane does more of the deflection work, and the convex side, which already has adverse pressure gradients on it, is not required to work as hard in deflecting the flow, thus preventing the flow from separating from the convex surface or downstream side of the vane.

The present invention is able to provide a balanced arrangement of lift and thrust generators in hover, a balanced and stabilized aerodynamic configuration when the majority of lift is generated aerodynamically (as in forward flight), and a balanced response to an engine failure. To depict these conditions, reference is made to FIG. 4 which shows the arrangement of the nacelles 12, 14, 16 and 18 on the fuselage 10. The centers of lift 112 and 114 of the two forward nacelles 12 and 14 are positioned forward of the center of gravity 120 at the same distance along the longitudinal centerline of the fuselage as the centers of lift 116 and 118 of the two rear nacelles 16 and 18 are positioned rearward of the center of gravity. However the two rear nacelles 16 and 18 are generally placed further outboard of and above the center line of the fuselage as compared to the positioning of the front two nacelles 12 and 14, to reduce the slipstream interference between the front and the rear nacelles. All four nacelles are the same size and have the same thrust rating. The level of thrust and the deflection of airflow of each nacelle is independent of the other nacelles to allow the aircraft to be balanced and stabilized in hover and in forward flight. Should one engine in a nacelle fail, the balance and overall thrust level of the aircraft can be maintained by a corresponding increase in thrust from the remaining engine in that nacelle as well as a small decrease in the thrust from the nacelle diagonally opposite the failed engine nacelle. Thrust will increase somewhat in the other two nacelles. This is automatically caused by the electronic stabilization system.

Figure 4:
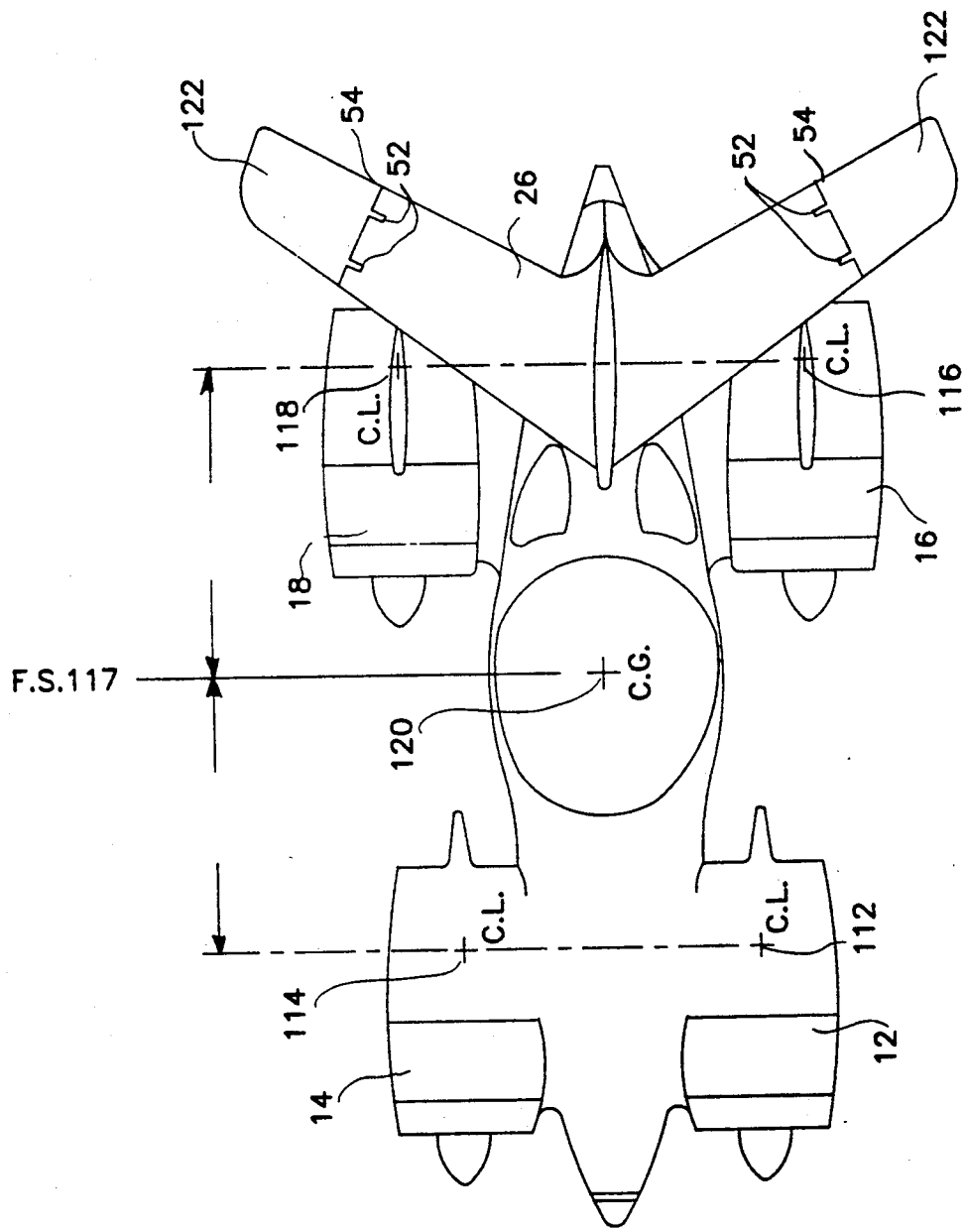
FIG. 4 is a top view of the preferred embodiment illustrating the location of the center of gravity of the aircraft and the center of lift of each nacelle in a hover mode.

The hinges 52 at the folding joint 54 of the horizontal stabilizer tips 122 are shown most clearly in FIG. 4. From the hinge 52 to the tip 122, the horizontal stabilizer 26 can be folded downward and locked in place behind the nacelle, for ground travel and convenience in parking and storage. When the tips 122 are folded, the horizontal stabilizer 26 is approximately equal to the width between the outer extremity of nacelles 16 and 18 at their widest point. This distance can be adapted to that required by law to enable the aircraft to operate legally on the highway.

FIG. 4 also details the relationship between the center of gravity 120 of the aircraft and the center of lift 112, 114, 116 and 118 of the nacelles 12, 14, 16 and 18 during hover. While the collective centers of lift from vectored thrust of the nacelles during hover is at the center of gravity of the aircraft, during forward flight aerodynamic lift causes the overall center of lift of the nacelles to move substantially ahead of the center of gravity resulting in a dynamic imbalance of lift. This imbalance is compensated for by the unique horizontal stabilizer 26 as shown in FIGS. 5a through 5c.

Figure 5C:
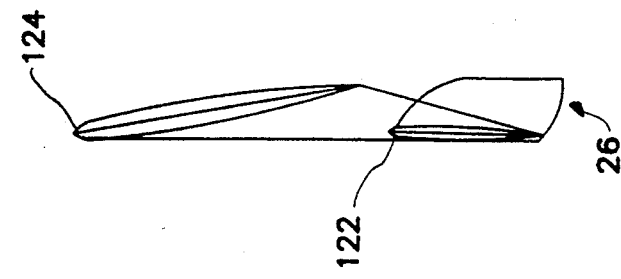
FIGS. 5a, 5b and 5c are plan, rear, and side views respectively, illustrating details of the horizontal stabilizer of the aircraft shown in FIG. 1.
Figure 5A:
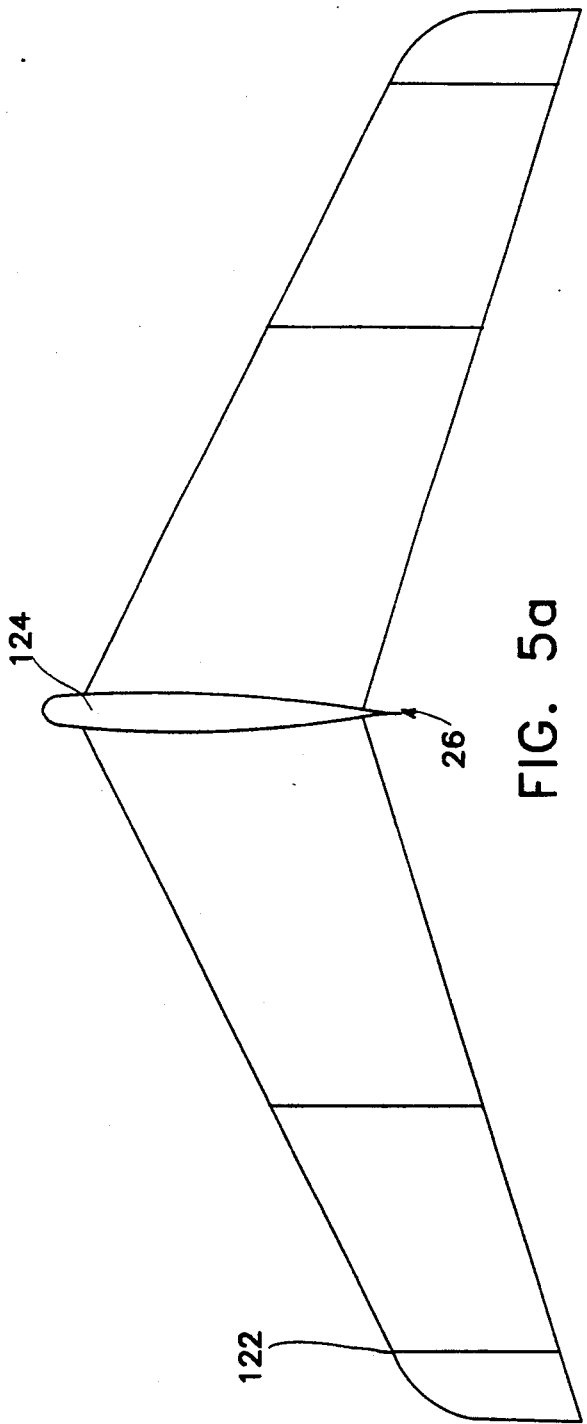
Figure 5B:
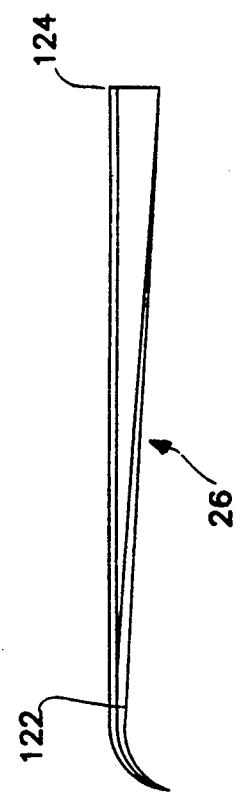

The horizontal stabilizer 26 of FIGS. 5a, 5b and 5c has a traditional swept wing design with a novel twist along its span and is downwardly curved at its tips 122. FIG. 5a is a plan view of the horizontal stabilizer showing the traditional swept wing design. As indicated in FIG. 5c, in the preferred embodiment the horizontal stabilizer has an angle of incidence of 10 degrees at the root 124, and a negative 5 degree angle of incidence proximate the curved tips 122, for a total difference of 15 degrees hence, giving rise to a twist in the horizontal stabilizer along its length. FIG. 5b is a rear view further illustrating the horizontal stabilizer configuration. The tip is curved to maximize the effective span while keeping the real span low. The tips are curved downward to minimize the overall height of the aircraft.

Figure 6A:
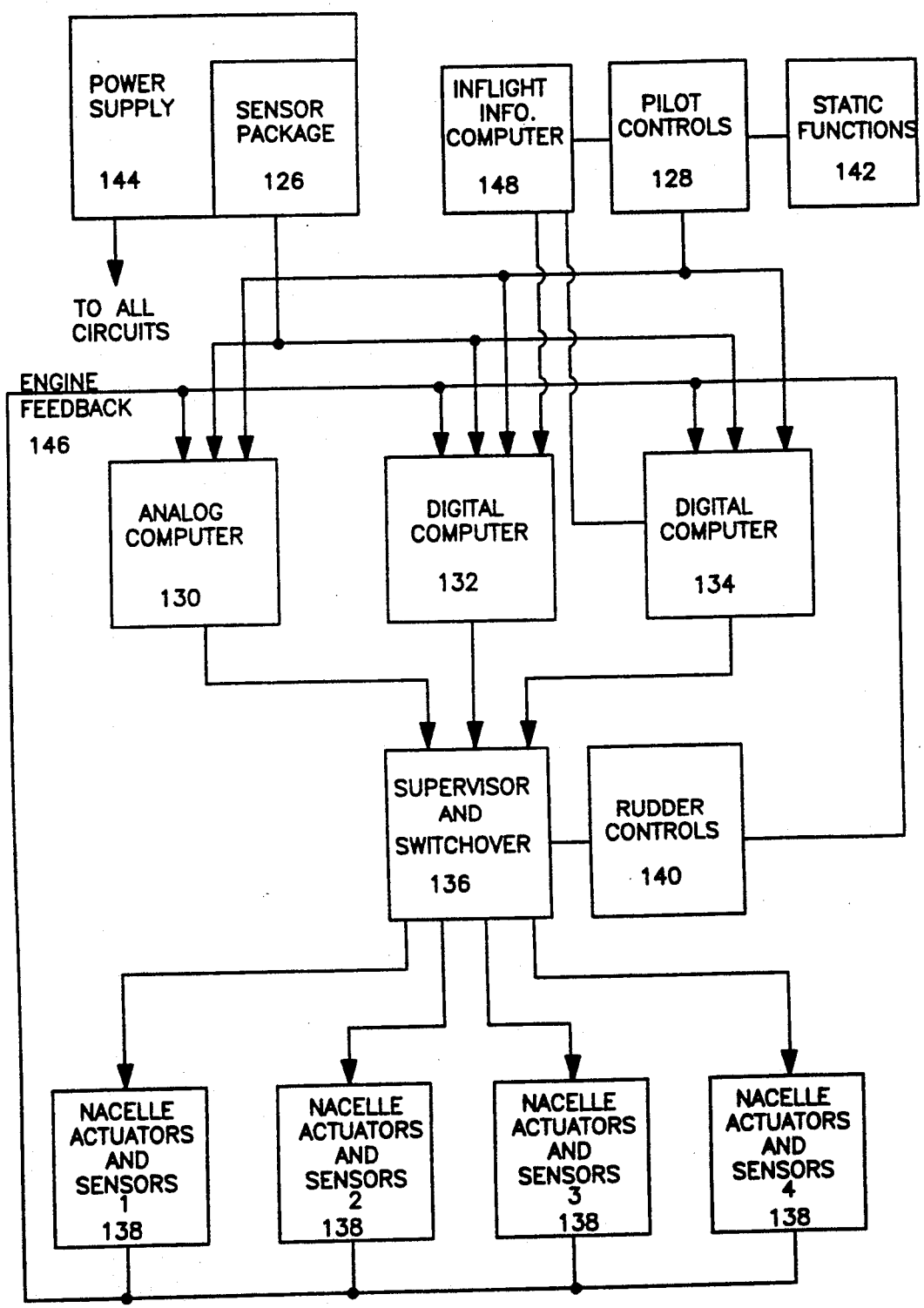
FIG. 6a is a block diagram illustrating the triple redundant computerized flight control system of the preferred embodiment.

FIG. 6a is a block diagram illustrating the basic components of the triple redundant flight control system of the preferred embodiment. The system stabilizes the attitude of the aircraft in pitch and roll during hover and early transition primarily by modulation of engine thrust levels. During latter transition and full forward flight, the vanes are the primary means of providing control. The aircraft is also capable of maintaining the heading of the aircraft along a flight plan that has been preprogrammed into its computers. The components of the flight control system are the sensor package 126, pilot controls 128, analog computer 130, two digital computers 132 and 134, a supervisor 136 and four sets of nacelle actuators and sensors 138.

Inputs into the computers 130, 132 and 134 are signals from the inertial sensors of the sensor package 126, pilot input, and feedback signals from the nacelle sensors 138. In hover, each computer 130, 132 and 134 receives the electrical signals, calculates the thrust level and thrust deflection required in each nacelle, and sends appropriate information to each engine throttle for pitch and roll stabilization and control, and to the nacelle vane actuators for yaw stabilization and control.

In full forward flight or transitioning flight, each computer 130, 132 and 134 receives the input electrical signals, calculates the required amount of control actuation, and sends the control information to both the nacelle vane actuators 138 and engine throttle for pitch, roll and yaw control. The pilot can select the desired direction, but the computer will calculate the appropriate balance of speed, rate of climb and attitude.

Each digital computer 132 and 134 of the preferred embodiment consists of a 80186 type processor and a plurality of analog-to-digital and digital-to-analog converters. In normal operation, the two digital computers 132 and 134 are alternately accessed by the supervisor 136, so that each controls the flight operation for approximately 10 milliseconds. This creates a system of checks for possible malfunction in either computer. Should one digital computer fail, the other digital computer will solely control the flight operation. Should both digital computers fail, the analog computer 130 will adequately control the flight operation.

The power supply 144 is made fail-safe for any single electrical fault and most dual faults by its combination of a secure battery bus, electrical fusing, switching regulators and linear regulators.

Figure 6B:
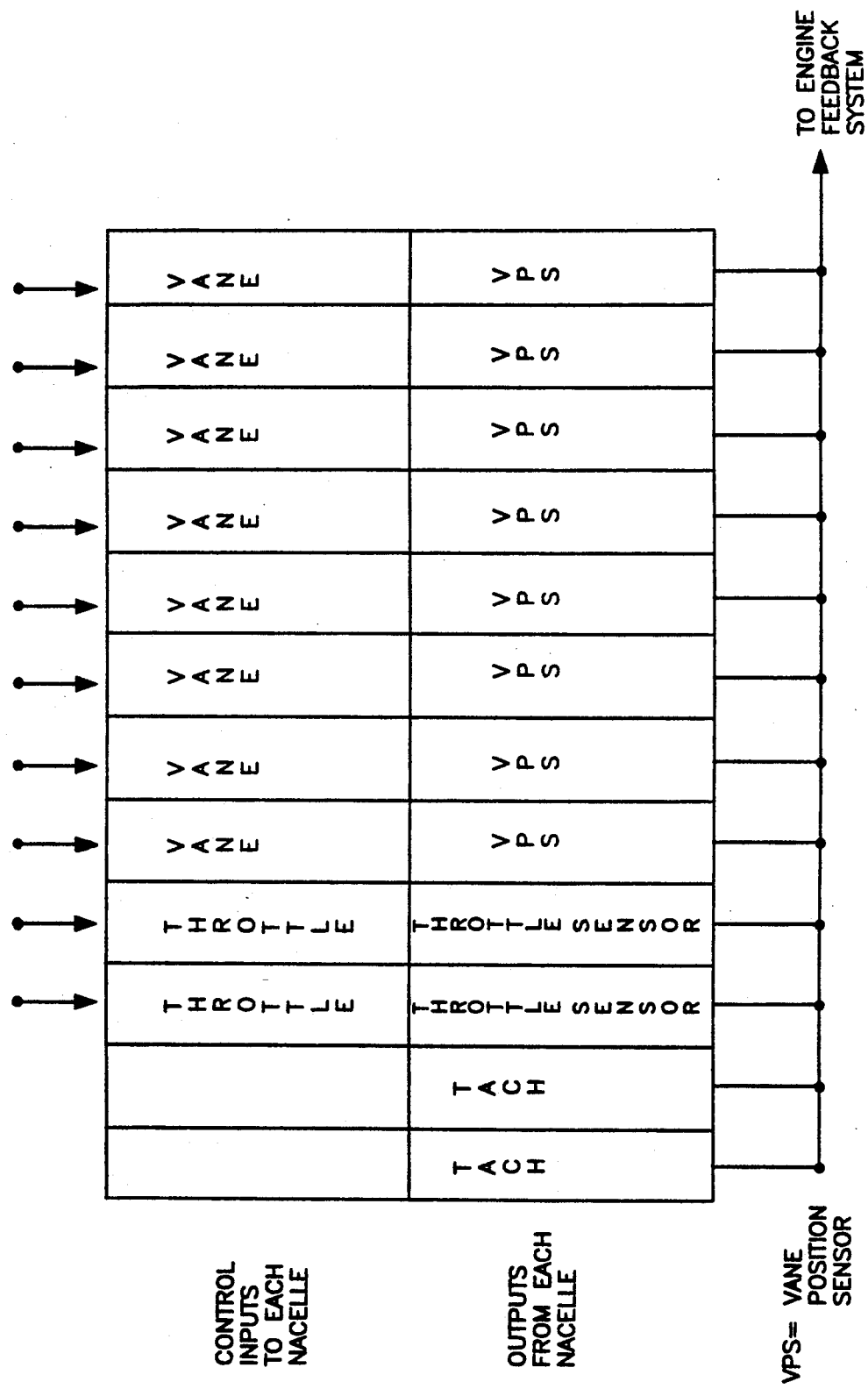

FIG. 6b is a diagram of an enlarged nacelle block (FIG. 6a) showing the actuators and sensors within each nacelle. The top row represents actuators which receive signals from the supervisor 136 and in turn drive the appropriate mechanical part. The bottom row depicts the position response sensors within each nacelle. Each sensor generates an output signal which is fed back to each computer giving it the status of each engine and set of vanes.

There are two actuators within each nacelle for engine throttle control. This is to say that each engine's throttle is controlled independently. There are also eight actuators within each nacelle for vane deflection control. As previously stated, each nacelle contains two independent sets of vanes and there are four control actuators per set of vanes for safety. Should one actuator pair fail, the other actuator pair could implement partial deflection of the vanes for balanced flight control.

For each nacelle, there are two sensors for sensing throttle position (one for each engine in the nacelle), eight sensors for sensing the vane position (four for each set of vanes), and two tachometers for monitoring engine speed (one per engine). The outputs from these sensors are combined into a system of feedback 146 which is routed from each engine to the computers, as shown in FIG. 6a. The computers utilize this information in combination with information received from the sensor package 126 to make any necessary adjustments in the positioning of the vanes or level of thrust of the engines in order to keep the aircraft balanced and stabilized.

In addition to the stability provided by the computerized flight control system, roll, pitch and yaw can be controlled by the pilot through the pilot controls 128. This means that both the pilot and the computer have control of roll, pitch and yaw. Under normal conditions, the two are doing different jobs. The pilot gives the aircraft inputs of moderate magnitude to control the aircraft's motion or direction while the computer provides stabilization inputs. More specifically, the pilot lacks the short response times necessary to stabilize the aircraft during hover and most of transition. This is where the computer plays an essential role in stabilizing the aircraft. Its commands are typically of very small magnitude, but with a far shorter response time. These small, quick corrections of the pilot's overall commands result in stabilized hover and transition.

The pilot can directly control the static functions suggested by box 142. These functions include operation of the landing gear, opening and closing of the canopy, activation of the motor and worm gear assembly that folds the horizontal stabilizer tips down and locks them into place, and activation of the rockets that deploy the emergency parachute.

As previously mentioned, the computerized flight control system primarily functions to stabilize the aircraft. During hover, the vanes are deflecting the airflow out of the nacelle through approximately 90 degrees. Pitch and roll stabilization, using information from the sensors and feedback, is achieved through thrust level modulation and does not involve vane movement. When the aircraft is hovering over one spot (no wind), the vanes control only yaw. This is accomplished by moving the vanes to a greater deflection on one side of the aircraft (over 90 degrees) and moving them to a smaller deflection (under 90 degrees) on the other side. The deflection of the thrust away from 90 degrees will slightly lower the overall thrust, approximately 0.3% for a 5 degree deflection. The stabilization system can be designed to hold a desired altitude, so that the overall thrust level would automatically increase to generate this lost thrust during a yawing maneuver. Moving backwards in a strong wind or braking rapidly is achieved by using a backward position of the right hand directional control stick to achieve the required differential thrust level for pitch. To resist side winds or move sideways during hover, the thrust level is increased on the opposite side to the desired direction of motion. Correspondingly, the thrust level will be decreased on the other side by the stabilization system just enough to maintain the average RPM or thrust level. The vanes are not involved in side motion control during hover or low speeds.

During transition, the vane position plays an indirect part in roll stabilization and control. With the directional stick neutral, the roll stability is still controlled essentially by power or thrust levels as in hover, but because the vanes are now partially retracted, a computer initiated thrust level change to correct an unwanted roll will also produce a yaw moment. Utilizing information provided by the yaw sensor, the computer will correct the moment by deflecting the vanes. For example, if the aircraft inadvertently rolls to the right, thrust level on the right side will increase producing a corrective rolling moment to the left and also causing the aircraft to yaw towards the left. This yaw, however, is corrected by slight automatic retraction of the vanes on the left side due to input from the yaw sensor as well as a pre-programmed response to this combination of movements. This simultaneously provides a correcting yaw moment to the right and further increases the corrective rolling moment by reducing the vertical thrust on the left hand side. Ideally, the degree of vane movement used for roll stabilization will be selected to ensure a convergent yaw and roll motion after a roll or yaw disturbance. A similar action takes place when the aircraft is disturbed in yaw. For example, an unwanted yaw to the right would automatically cause the right side vanes to retract and the left side vanes to extend. This would introduce a roll moment to the right which would be corrected by the pre-programmed response and roll sensor increasing the thrust level on the right side, canceling the adverse yaw.

If, on the other hand, the pilot wishes to turn to his left, he will move the directional stick to the left which will increase the thrust level on the right hand side simultaneously causing the aircraft to roll to the left and yaw to the left resulting in a turning to the left. This is consistent with a coordinated turn to the left. The pilot could twist the directional stick which will independently move the vanes to ensure that a coordinated turn is achieved. However, it is far easier to let the computer adjust the vane position automatically so that coordinated turns can be achieved entirely by side motion of the direction stick.

Longitudinal control (speed and movement in the longitudinal direction) originates from fore or aft movement of the right hand directional control stick. This stick affects movement or no movement in a horizontal direction. For movement forward or backward, a combination of differential throttle control and nacelle vane position control is available to provide the longitudinal force necessary for such movement. The flight control computer could be programmed to provide the best choice. For example, during take-off and early transition it may be advantageous to operate the aircraft in a nose down position for improved visibility. If this were the case, then pitching the nose down might provide most of the translational force required during early transition. If a rapid acceleration (large force) was required, then the vanes could retract somewhat to vector some of the thrust longitudinally as well.

The aircraft has the facility for an automatic altitude hold feature wherein a selected altitude is maintained in response to inputs from a radar altimeter at low altitudes and a barometric altimeter at high altitudes. This ensures that the aircraft maintains altitude while slowing down. The pilot can also pre-select the rate of climb or descent. Therefore, if he desires to slow down and descend, he would first select a rate of descent and then a new altitude. The thrust level would automatically reduce to achieve that rate of descent. The pilot would then slow the aircraft down by aft movement of the directional stick which would first extend the vanes. The vane position, airspeed and selected rate of descent will cause the flight control computer to adjust the thrust or power level accordingly. At significantly reduced thrust levels, the vanes become drag producers as well as lift generators. This allows a rapid reduction in forward speed, if desired. As transition speeds are entered (speeds less than 125 m.p.h.), the computer would adjust the thrust levels upwardly in order not to exceed the selected rate of descent.

For very rapid braking after the vanes are fully extended and the airspeed is low enough that aerodynamic forces are not excessive, the aircraft can be positioned in a nose high attitude to introduce additional drag and a large vectored thrust component in the forward direction. This is achieved by moving the directional stick sufficiently far back.

There is also an inflight information computer 148 included in this preferred embodiment that does not directly interface with the computerized flight control system. This computer conveys information from certain aircraft sensors such as the engine temperature gauge and the Pitot-static tube, etc., and displays them in easy to understand, visual images on the pilot's instrument panel.

FIGS. 7a through 7d show how lift is generate in four flight regimes from takeoff or hover modes through forward flight.

Figure 7A:
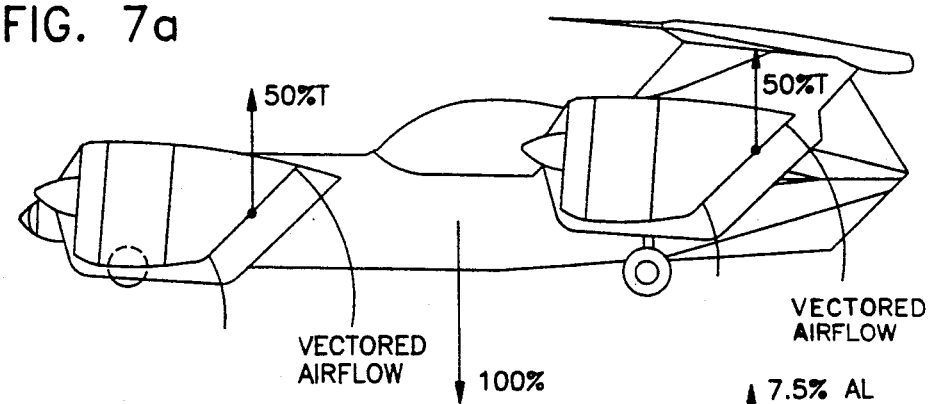
FIGS. 7a through 7d are four side views showing the aircraft of FIG. 1 in transition from takeoff through forward flight.

FIG. 7a shows an aircraft in the takeoff or hover mode. In this mode, all of the lift is generated by vectoring the fan thrust from the engines through the deflector vanes where the vanes are fully extended for maximum deflection of the airflow. Also, in this mode, pitch and roll are controlled by changes in engine thrust level, and yaw is controlled by changes in the amount of deflection of the vanes, i.e. the position of the vanes within their guide slots.

Figure 7B:
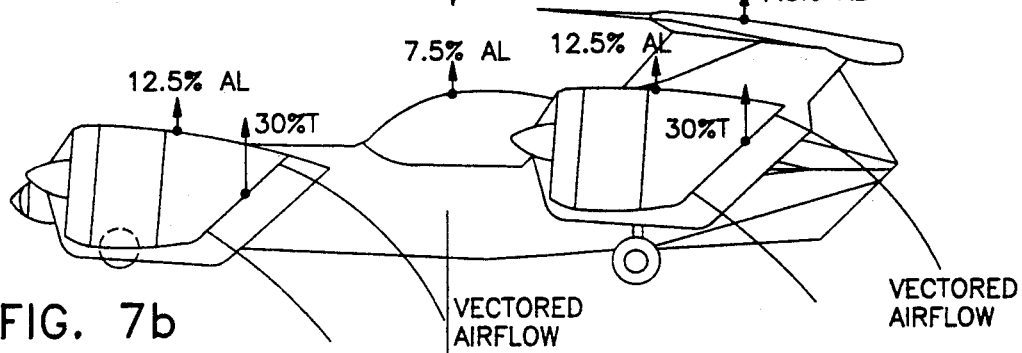
Figure 7C:
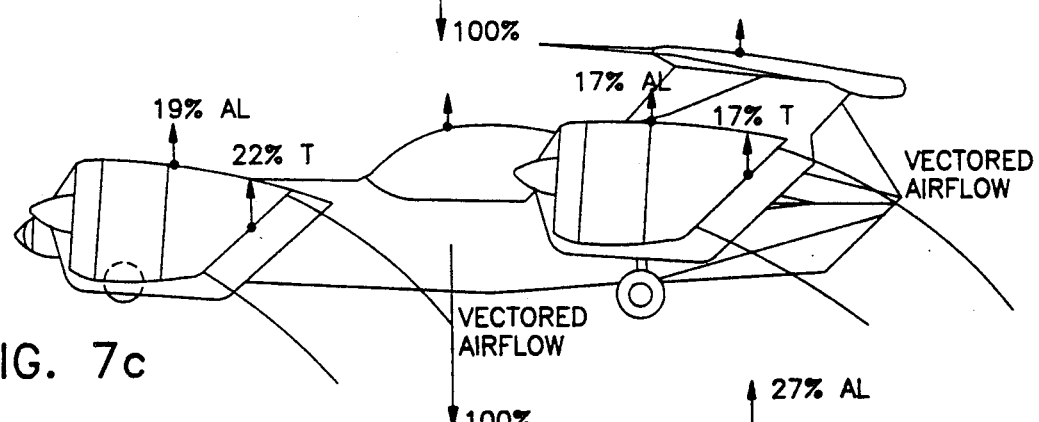

At the start of transition to forward flight, the greater part of the lift is generated by the vectored fan thrust with very little, if any, of the lift being generated by the aerodynamic characteristics of the lifting bodies (nacelle, horizontal stabilizer, fuselage). As transition progresses toward forward flight, as shown in FIGS. 7b and 7c, more of the lift is generated by the lifting bodies and less by the vectored fan thrust until the ratio of aerodynamic lift dominates over the lift from thrust. In both stages, pitch, roll and yaw are controlled by both vane deflection and engine RPM changes.

Figure 7D:
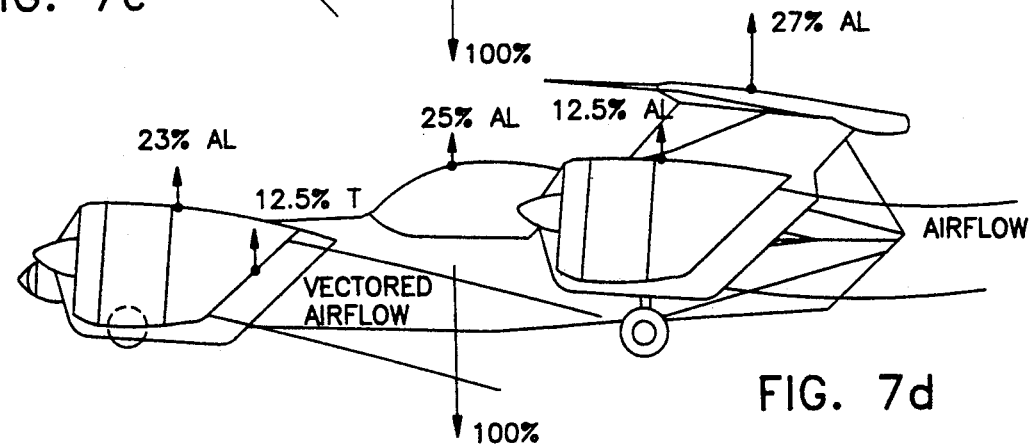

FIG. 7d shows an aircraft in a full forward flight mode, where virtually all lift is aerodynamically provided by the lifting bodies. A negligible amount is provided by fan thrust. In this mode, pitch and roll are controlled by vane deflection alone, and yaw is generally controlled by vane deflection and engine RPM changes.

To enter the aircraft, the pilot opens the canopy and seats himself in the cockpit. Once inside, the pilot initializes the computers and sets his flight destination. He uses a small electric motor driving one wheel to move the vehicle out of its parking area. He then starts one engine in each of the rear nacelles, and uses the rearward thrust to drive the craft to an appropriate takeoff site. At the takeoff site, the pilot initiates the computer controlled starting sequence which starts the remaining six engines. To save weight, only one of the two engines in each nacelle has a starter. The other engine is started by using the aerodynamic interaction of the two fans to turn the non-running engine at sufficient speed for starting. Upon ignition of the engines, the flight computer takes control over the flight operation and will execute a pre-flight checklist. The pilot, through his controls, can now select the altitude and rate of climb, and control the speed and direction of the craft. He does not direct the flight management, as this is the function of the flight computer.

The flight computer carries a great responsibility in the operation of the aircraft. This is the reason why the triple redundancy flight computer safety feature is so important. The triple redundancy feature operates by having the supervisor constantly check each digital computer for possible malfunction. If one of the digital computers fails, the other takes over complete control of the flight operation. If both digital computers fail, the analog computer takes over control of the flight operation. The potential utilization of three computers creates the triple redundancy safety feature.

In the event of a known or probable computer flight control system failure, it is possible to provide a direct link between the pilot controls and top movement of the outside set of vanes of the front two nacelles. This could give the pilot adequate control of the aircraft in both pitch and roll during full forward flight. This control would then be used to slow the aircraft to an acceptable parachute deployment speed and to direct the aircraft to an appropriate parachute deployment site.

Following the computerized pre-flight check, the computer will indicate to the pilot that all systems are functioning normally and that the aircraft is ready for flight. The pilot will initiate takeoff by advancing the altitude select control to the "ground effect hover" altitude. The computer will operate the aircraft into a stable, hover mode and perform a final pre-departure check. In this hover mode, all of the lift is generated by vectoring the fan thrust through the fully deflected vanes. Also, in this mode, the computer controls pitch and roll by varying the respective engine thrust levels, and yaw is controlled by the amount of deflection of the vanes. The aircraft will continue to hover until the pilot selects an altitude and a rate of climb. Once selection is made, the computer calculates the level of engine power needed to achieve the pilot's desires, taking into consideration other factors such as vehicle gross weight, and gets ready to accelerate the aircraft into a controlled ascent.

When the pilot moves the left hand controls to select altitude and rate of climb, the computer will adjust the power and start vertically rising at the specified rate towards the selected altitude. When the pilot moves the directional stick forward, the aircraft will also begin moving into forward flight toward the desired altitude while maintaining the selected rate of climb. The vanes, which were fully deflected for the hover mode, will be slowly retraced to transition the aircraft into forward flight. During this transition phase, the computer controls pitch, roll and yaw by both vane deflection and engine thrust level changes. As the aircraft gains forward airspeed and the fuselage, horizontal stabilizer and nacelles start to generate lift, the computer automatically adjusts the deflection of the vanes to maintain the appropriate attitude of the aircraft for efficient aerodynamic lift. When the vanes are no longer significantly deflecting the nacelle airflow downward, the aircraft will have completed transition and achieved sufficient flying speed for full aerodynamic flight.

In full forward flight mode, where virtually all lift is provided by the lifting bodies, the computer controls pitch and roll by vane deflection, and yaw is controlled by the vanes and thrust level changes. In this mode, no pilot input is necessary due to the pre-programmed flight destination that the pilot initially input into the computer. However, the pilot may change the heading, altitude, or airspeed if he so desires.

The sequence of events for landing the aircraft are the exact opposite of those for takeoff. When the pilot is ready to transition into a descent, he will select the rate of descent and new altitude and then apply back-pressure on the right hand directional control stick. The computer will adjust the engine thrust levels and vane positions to cause the aircraft to descend. When the aircraft nears the chosen landing site, the pilot moves the altitude select control to the "hover" or "land" position. The computer then guides the aircraft into the selected mode.

Although a passenger aircraft is utilized in the above example, the present invention can also be used as a vehicle for transporting other payloads from one place to another under automatic control. The present invention is also suitable for use as a drone or any other application normally fulfilled by pilotless aircraft.

Furthermore, the vane system and its deployment mechanism can be used (independently of an aircraft) as an apparatus for vectoring airflow, or for effecting fluid stream directional control. For example, the concept of the present invention could be incorporated in a blower of the type used in agricultural applications for keeping frost from forming on crops. Alternatively, the vane system could be implemented in a water jet propulsion system of the type used to power water borne vehicles and the like. The present invention would be particularly effective in the latter implementation because of its low actuating force requirements in an environment in which flow direction of a flow stream having substantial mass is involved.

Figure 8A:
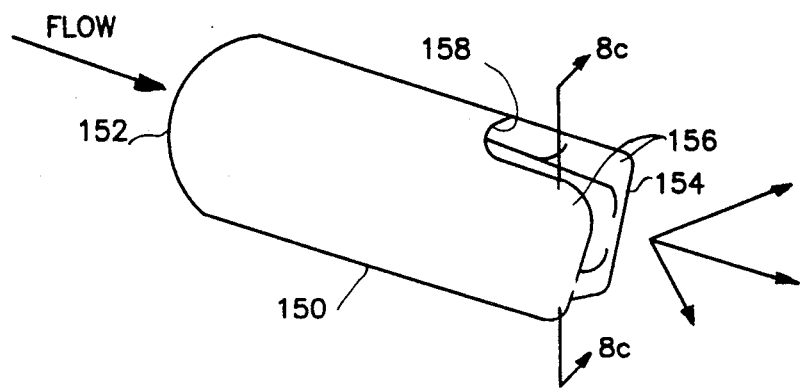
FIG. 8a is a perspective view of an apparatus for effecting flow stream directional control.

FIGS. 8a through 8d illustrate an alternative embodiment of a vane system and its deployment mechanism. FIG. 8a is a perspective view of an apparatus for effecting flow stream directional control consisting of a housing 150 having, at its inlet end 152, a generally annular shape that transitions to a rectangular configuration at its outlet 154, with one pair of opposing sides 156 being of greater length than the other pair of opposing sides 158, and a bidirectional vane system which will be discussed in detail to follow. The sides of lesser length 158 provide clearance for the redirected stream flow.

The apparatus is capable of deflecting the exiting flow stream to one side or the opposite side thereof, and in excess of 90 degrees in each direction. Additionally, by rotating the apparatus about its longitudinal axis, the flow plane along which the flow stream can be deflected can be changed.

Figure 8B:
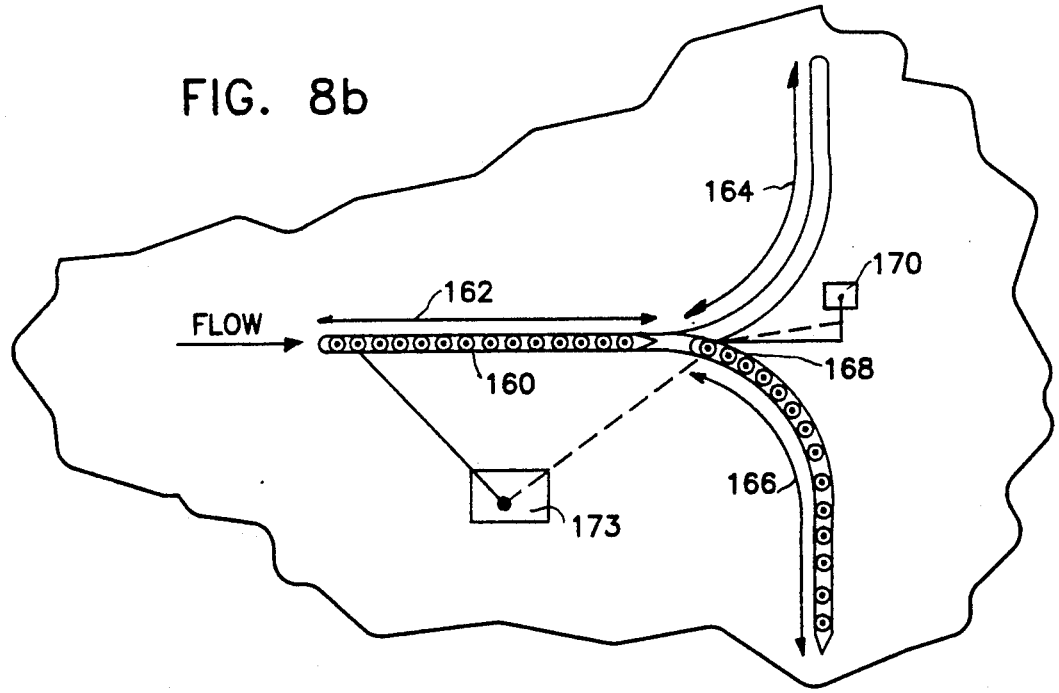
FIG. 8b is a diagram showing a vane and bidirectional guide slot assembly.

The bidirectional capability of one of the vanes of the vane system of this embodiment is illustrated in FIG. 8b by a diagram of a centrally positioned vane and guide slot not depicted in FIG. 8a. As illustrated, the vane 160 is in a horizontal, non-deflecting position within the straight section 162 of the guide slot. Following the straight section, there are two circularly arcuate sections 164 and 166 of guide slot that branch off in opposite directions.

A dual position slot gate 168, disposed at the junction of the straight and curved sections of the guide slot, is driven by an actuator assembly 170 and operates to block the entrance to one of the two curved sections of the guide slot, so that when the vane is extended, it will follow the path of the guide slot whose entrance is not blocked by the slot gate. The deployment mechanism 173 actuates the movement of the vane within the guide slot. As illustrated, the entrance to the upper curved section of guide slot is blocked by the slot gate, and the dashed line shows the position of the slot gate actuator if the gate were blocking the entrance to the lower curved section of guide slot. Similarly, the dashed lines for the deployment mechanism and vane depict the positioning of those items if the vane were fully extended within the guide slot.

Figure 8C:
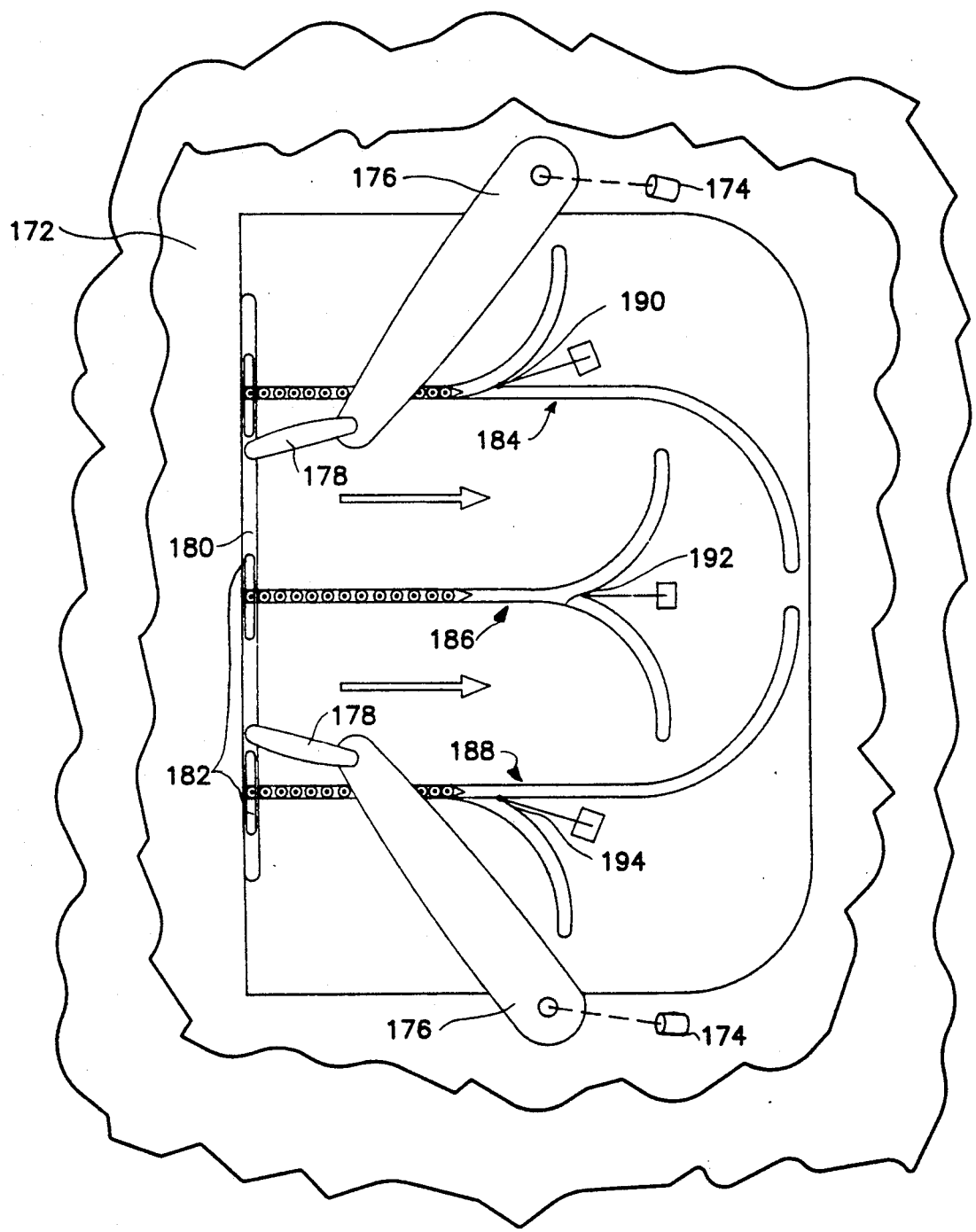
FIGS. 8c and 8d are partial cross sectional views through the apparatus taken along the line 8—8 of FIG. 8a, showing the interior wall of a vane guide containing panel of the apparatus together with the vane control mechanisms and vanes in two extreme positions.

FIG. 8c is a broken partial side view taken along the line 8c—8c of FIG. 8a showing the interior wall of a vane guide containing panel 172 of the apparatus, with the vane deployment mechanism attached. A vane guide containing panel is disposed within each of the opposing sides 156 of the apparatus that have the greatest lengths.

Similar to the preferred embodiment, the deployment mechanism for this apparatus consists of a drive motor 174, actuator arm 176 and linkage 178 assembly which moves the actuator bar 180. The leading edge of each vane is attached to the actuator bar at an elongated slot 182 which allows the actuator bar to be moved at an angle limited by the bounds of the elongated slot. The straight portion of the top guide slot 184 is extended beyond the intersection with the upwardly extending curved portion such that the downwardly extending curved portion thereof is located in a cascaded relationship to the corresponding downwardly curved portion of the central slot 186 and the bottom slot 188. The central slot 186 has a straight portion immediately followed by two curved portions that branch off in opposite directions therefrom. Note that this is the centrally disposed vane and guide slot as described in FIG. 8b. The bottom guide slot 188, the reciprocal of the top guide slot 184, has its straight portion extended beyond the intersection with the downwardly extending curved portion such that the upwardly extending curved portion thereof is located in a cascaded relationship to the corresponding upwardly curved portion of the central slot 186 and the top slot 188. As previously described in FIG. 8b, the slot gate 192 for the central slot is disposed at the junction of the straight and curved sections of the guide slot. In contrast with the central slot, the slot gates 190 and 194, for the top and bottom guide slots respectively, are displaced at the first intersection of the straight section and a curved section, from the upstream end of the guide slot.

FIG. 8c further illustrates the vanes in a horizontal, non-deflecting mode, and the slot gates blocking the entrance to the downward deflecting guide slots, thereby creating a continuous guide slot path into the upwardly curved slots. The curved portion of the slots bend at a 5 degree angle normal to the longitudinal axis of the apparatus in order to deflect the flow stream beyond 90 degrees in each direction.

Figure 8D:
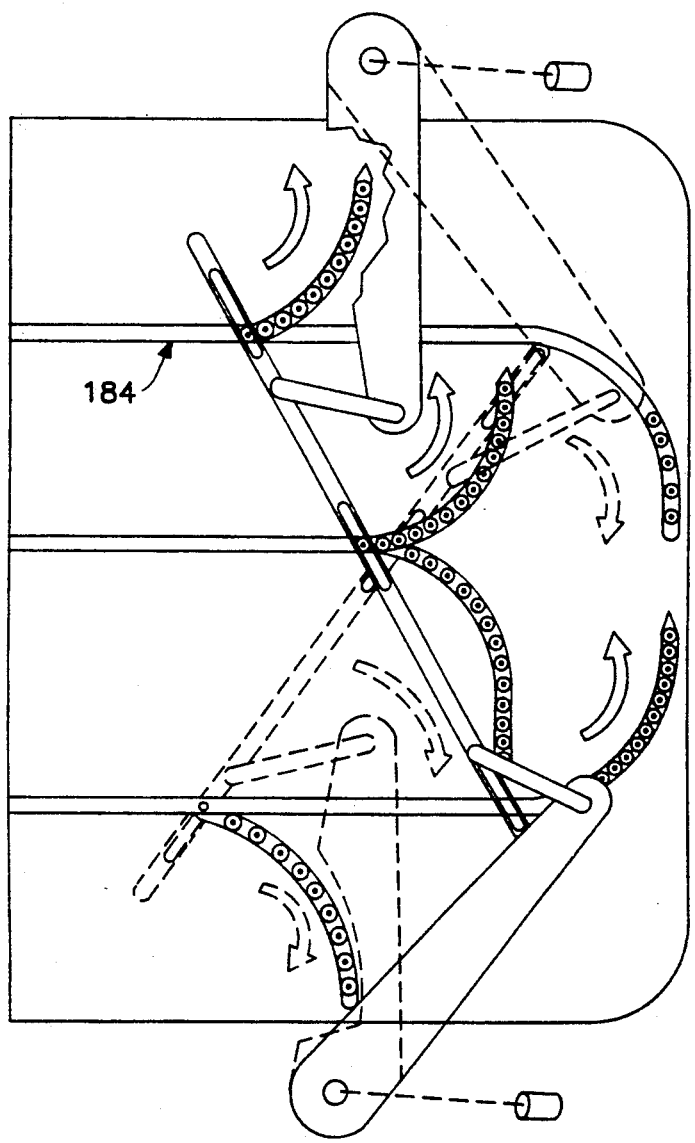

FIG. 8d illustrates the vane system of FIG. 8c in a full deflection mode. The top actuator arm is broken away to better illustrate the cambered vane within the upwardly curved section of the top guide slot 184.

Alternately, the vane system can be used to reduce the exit area by having the slot gates block the outwardly curving portions of the guide slots, thereby creating a continuous guide slot path into the downwardly curved slot of the top guide slot, and into the upwardly curved slot of the bottom guide slot. In this configuration, fully extending the vanes would cause the top vane to deflect downward and the bottom vane to deflect upward, thereby directing the flow stream through the very narrow exit opening created by the extended vanes. For this purpose, the direction of the deflection of the central slot is immaterial. Also, if the trailing edges of the extended vanes within the guide slots were sufficiently close together, the exit could in effect be shut off completely. These attributes can be used to reduce noise, to assist in wheel braking during landing, or to shut down an engine if desired.

The operation of the bidirectional vane system is identical to that previously described in the preferred embodiment with the exception of the availability of the second curved section of guide slot and the operation of the slot gate. An apparatus containing a bidirectional vane system is operable by input signals from a human operator or a computerized system similar to that described in the preferred embodiment. Additionally, an operating computer can be programmed to extend the vanes to deflect the flow stream in one direction, retract the vanes so that there is no deflection of the flow, extend the vanes to deflect the flow in the opposite direction of the previous deflection, retract the vanes again and so forth, to achieve a flow variably deflected over 180 degrees, without requiring a complex mechanism to pivot the apparatus itself.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A VTOL aircraft comprising:
   an elongated fuselage configured to develop aerodynamic lift when moved forward in the direction of its longitudinal axis;
   at least one vertical stabilizer connected to an aft portion of said fuselage;
   a horizontal stabilizer connected to said vertical stabilizer;
   a plurality of fixed nacelles disposed fore, aft and on either side of the center of gravity of said fuselage and rigidly connected thereto and operative to generate independent streams of airflow for propelling and stabilizing said aircraft, each said nacelle having powerplant means and propeller means driven thereby which rotate bout an axis substantially parallel to said longitudinal air and cause air to flow through the nacelle and an airflow directing vane system including a plurality of vanes disposed at the aft end of the nacelle and movable between a first position directing airflow passing out of said nacelle in a direction parallel to the longitudinal axis of said aircraft, and a second position directing said airflow at an angle relative to said longitudinal axis; and
   control means for controlling the power generated by each said powerplant means and the positions of the corresponding vanes to cause said airflow to be directed downwardly to case said aircraft to rise vertically, and to alternatively be directed rearwardly to cause said aircraft to move in a forward direction, the power supplied by each said powerplant means and the position of the corresponding vanes being coordinated to maintain the balance and stability of the aircraft.

2. A VTOL aircraft as recited in claim 1 wherein said nacelles are positioned so that when all airflow is directed downwardly from each nacelle at predetermined engine power settings, the combined center of lift of the aircraft is located proximate the center of gravity of said aircraft.

3. A VTOL aircraft as recited in claim 1 wherein said vertical stabilizer is affixed directly to the aft end of said fuselage and rises immediately thereabove.

4. A VTOL aircraft as recited in claims 1 or 3 wherein said plurality of nacelles includes at least one aft nacelle located on each side of said fuselage.

5. A VTOL aircraft as recited in claim 4 and further comprising second and third vertical stabilizers respectively disposed on opposite sides of said first vertical stabilizer and respectively mounted to one of said aft nacelles.

6. A VTOL aircraft as recited in claim 5 wherein an upper portion of each of said second and third vertical stabilizers is affixed to said horizontal stabilizer.

7. A VTOL aircraft as recited in claim 1 wherein said horizontal stabilizer is comprised of two symmetrical halves, each half being swept and having a predetermined twist from root to tip.

8. A VTOL aircraft as recited in claim 7 further comprising downwardly turned cuffs formed in each tip.

9. A VTOL aircraft as recited in claims 1 or 8 wherein said horizontal stabilizer is articulated to allow the airfoil to be folded to reduce span dimension for ground travel or storage.

10. A VTOL aircraft as recited in claim 1 wherein said plurality of nacelles includes a first and second nacelle respectively disposed forward of the center of gravity of said aircraft and on opposite sides of said longitudinal axis.

11. A VTOL aircraft as recited in claim 10 wherein said plurality of nacelles includes third and fourth nacelles respectively disposed aft of said center of gravity and on opposite sides of said longitudinal axis.

12. A VTOL aircraft as recited in claim 1 or 11 wherein said nacelles have external surfaces configured to develop lift when moved forward in the direction of said longitudinal axis.

13. A VTOL aircraft as recited in claim 12 wherein said nacelles have a front opening and a rear opening, said rear opening lying in a plane the upper portion of which is rotated aft relative to a plane normal to the longitudinal axis of said nacelle.

14. A VTOL aircraft as recited in claim 11 wherein said at least one vertical stabilizer affixed directly to said external surface of said third and fourth nacelles and rising immediately thereabove.

15. A VTOL aircraft as recited in claim 14 wherein said control means further include sensor means responsive to said engine power levels and vane position, and operative to develop engine power level signals and vane position signals for communication to said power control means.

16. A VTOL aircraft as recited in claim 1 wherein each said powerplant means includes a pair of engines located along the longitudinal axis of its corresponding nacelle.

17. A VTOL aircraft as recited in claim 16 wherein each of said engines directly drives a propeller, said propellers being driven independently of each other, being positioned to face each other, and being caused to counter-rotate with respect to each other.

18. A VTOL aircraft as recited in claim 16 or 17 wherein said engines are rotary engines.

19. A VTOL aircraft as recited in claim 17 wherein each said nacelle contains a system for routing pressurized air from a point downstream of said propellers through internal cooling passageways in said engines.

20. A VTOL aircraft as recited in claim 19 wherein each of said nacelles contains a baffle structure disposed downstream of said propellers and in the airstream flowing through the nacelle to reduce the noise of the exhaust from said engines.

21. A VTOL aircraft as recited in claim 20 wherein said baffle structure includes means forming an exhaust port through which said exhaust is passed and further including means forming an additional passageway having an entrance for receiving said pressurized air after it has been routed through said internal cooling passageways and an exit surrounding said exhaust port such that said exhaust causes said pressurized air to be drawn through said additional passageway and to be mixed with said exhaust.

22. A VTOL aircraft as recited in claim 1 wherein each said vane system includes a plurality of vanes disposed in the exit orifice of a corresponding nacelle and means for varying the camber of each said vane in order to direct said airflow.

23. A VTOL aircraft as recited in claim 21 wherein each end of each of said vanes is movably disposed within a curved guide slot formed along an inner wall of said nacelle near said rear opening.

24. A VTOL aircraft as recited in claim 22 wherein said plurality of vanes are disposed within said nacelle in a cascading configuration wherein the uppermost vane is positioned substantially aft of the lowermost vane.

25. A VTOL aircraft as recited in claim 23 wherein said plurality of vanes are disposed in two sets of vanes which operate independently of each other.

26. A VTOL aircraft as recited in claim 24 wherein one set of said two sets of vanes is disposed on one side of said longitudinal axis and the other set is disposed on the opposite side of said longitudinal axis.

27. A VTOL aircraft as recited in claim 25 wherein said plurality of vanes are articulated, and the articulated portions thereof move in succession into said first and second positions.

28. A VTOL aircraft as recited in claim 1 wherein said control means include:
sensor means for sensing pitch, roll and yaw, and developing pitch signals, roll signals and yaw signals; and
power control means responsive to said pitch, roll and yaw signals, and operative to control the power generated by each of said powerplants, and the positioning of each of said vanes so as to maintain the stability of said aircraft.

29. A VTOL aircraft as recited in claims 22, 23, 24, 25, 26 or 27 wherein each said vane is of a tambour-like construction.

30. An apparatus for controlling the flow of a gas or fluid stream comprising:
means for confining a flow stream and including a structure having an inlet portion with a longitudinal axis along which said flow stream moves and an outlet portion with inner wall means having at least two opposed sides;
a vane structure including at least one vane disposed within said outlet portion, said vane including a plurality of vane segments, the ends of which are movably disposed within guide slot means formed in said opposed sides, said guide slots having a straight portion and a curved portion; and means for moving said vane relative to said guide slot means to vary the camber of said vane in order to direct said flow stream at an angle relative to said longitudinal axis, as said flow stream exits said outlet portion.

31. An apparatus as recited in claim 30 wherein said means for moving said vane includes motor driven actuator bar means attached to said vane for driving said vane within said guide slot means.

32. An apparatus as recited in claim 31 wherein said vane structure includes a plurality of said vanes disposed within a plurality of guide slots formed in said inner wall means, said actuator bar being attached to each said vane for driving each said vane within corresponding guide slot means.

33. An apparatus as recited in claim 32 wherein each said guide slot means includes an additional curved portion and means for selectively coupling said straight portion to one of said curved portions whereby the corresponding vane can be extended into the selected curved portion of said guide slot means for directing said flow stream toward the corresponding side of said longitudinal axis.

34. An apparatus as recited in claim 33 wherein said vanes can be extended into the selected curved portion of said guide slot means for directing said flow stream through the narrow exit opening created by said extended vanes at said outlet portion.

35. An apparatus as recited in claim 34 wherein said plurality of vanes are disposed in two sets of vanes which operate independently of each other.

36. An apparatus as recited in claim 35 wherein one set of said two sets of vanes is disposed on one side of said longitudinal axis and the other set is disposed on the opposite side of said longitudinal axis.

37. An apparatus as recited in claim 36 wherein said plurality of vanes are articulated and the articulated portions thereof move in succession into said curved portions of said guide slot means.

38. An apparatus as recited in claim 30 wherein each said vane is of a tambour-like construction.

* * * * *

UNITED STATES PATENT AND TRADEMARK OFFICE
CERTIFICATE OF CORRECTION

PATENT NO. : 5,115,996
DATED : 5-26-92
INVENTOR(S) : Moller

It is certified that error appears in the above—identified patent and that said Letters Patent is hereby corrected as shown below:

In column 18, line 46, change the word "bout" to --about--.

In column 18, line 47, delete the term "said longitudinal air" and replace it with the term --said longitudinal axis--.

In column 18, line 59, change the word "case" to --cause--.

In column 19, line 47, after "said at least one vertical stabilizer", Add — includes a first and second vertical stabilizer --.

Signed and Sealed this

Fifth Day of October, 1993

Attest:

BRUCE LEHMAN

Attesting Officer   Commissioner of Patents and Trademarks